(12) United States Patent
Zuo et al.

(10) Patent No.: US 10,063,448 B2
(45) Date of Patent: Aug. 28, 2018

(54) METHOD AND SYSTEM FOR HEARTBEAT ADAPTATION

(71) Applicant: Tencent Technology (Shenzhen) Company Limited, Shenzhen (CN)

(72) Inventors: Gang Zuo, Shenzhen (CN); Chunsheng Xie, Shenzhen (CN); Rungui Ye, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 128 days.

(21) Appl. No.: 15/191,323

(22) Filed: Jun. 23, 2016

(65) Prior Publication Data

US 2016/0308748 A1 Oct. 20, 2016

Related U.S. Application Data

(63) Continuation of application No. PCT/CN2015/070346, filed on Jan. 8, 2015.

(30) Foreign Application Priority Data

Jun. 26, 2014 (CN) .......................... 2014 1 0298978

(51) Int. Cl.
*H04L 12/26* (2006.01)
*G06F 15/16* (2006.01)
(Continued)

(52) U.S. Cl.
CPC ............ *H04L 43/103* (2013.01); *H04L 43/16* (2013.01); *H04L 61/2553* (2013.01); *H04W 24/04* (2013.01); *H04W 76/25* (2018.02)

(58) Field of Classification Search
CPC ... H04L 43/103; H04L 43/16; H04L 61/2553; H04W 24/04; H04W 76/045
See application file for complete search history.

(56) References Cited

U.S. PATENT DOCUMENTS

2008/0165796 A1 7/2008 Martinez et al.
2013/0151714 A1* 6/2013 Ralph .................... H04L 43/10
709/227

(Continued)

FOREIGN PATENT DOCUMENTS

CN 101699912 A 4/2010
CN 103685241 A 3/2014
CN 104144159 A 11/2014

OTHER PUBLICATIONS

Tencent Technology, ISRWO, PCT/CN2015/070346, Apr. 14, 2015, 9 pgs.

(Continued)

*Primary Examiner* — Kiet Tang
(74) *Attorney, Agent, or Firm* — Morgan, Lewis & Bockius LLP

(57) ABSTRACT

A Method and a system for performing a heartbeat adaptation process are disclosed herein. A computing device detects a condition for initiating the heartbeat adaptation process in accordance with one or more predetermined criteria. In response to detecting the condition, the computing device performs the heartbeat adaptation process by sending, to a server, one or more first heartbeat test packets according to a predefined time interval. If the one or more first heartbeat test packets satisfy one or more test continuation criteria, the computing device: increases the predefined time interval according to a predetermined interval step; and repeats the heartbeat adaptation process using the increased predefined time interval. If the one or more first heart test packages satisfy one or more test termination criteria, the (Continued)

computing device: identifies a stable heartbeat interval according to the predefined time interval; and terminates the heartbeat adaptation process.

20 Claims, 20 Drawing Sheets

(51) Int. Cl.
*H04M 3/00* (2006.01)
*H04W 76/25* (2018.01)
*H04L 29/12* (2006.01)
*H04W 24/04* (2009.01)

(56) References Cited

U.S. PATENT DOCUMENTS

2014/0108497 A1* 4/2014 Yao .................... H04N 21/2387
 709/203
2014/0113611 A1* 4/2014 Ye ....................... H04L 47/2475
 455/418

OTHER PUBLICATIONS

Tencent Technology, IPRP, PCT/CN2015/070346, Dec. 27, 2016, 7 pgs.

* cited by examiner

In accordance with a determination that the one or more first heart test packages satisfy one or more test termination criteria: ⎯1112

Identify a stable heartbeat interval according to the predefined time interval; and Terminate the heartbeat adaptation process (B)

After terminating the heartbeat adaptation process, periodically send, to the server, one or more heartbeat packets according to the stable heartbeat interval ⎯1118

The heartbeat packet includes a location of the computing device ⎯1120

(D)

Determine a respective time interval preferred by the computing device based on one or more parameters; ⎯1122

Prompt the server to approve the respective time interval preferred by the computing device; and In accordance with a determination that the server approves the respective time interval, set the respective time interval as the stable heartbeat interval to bypass sending the one or more first heartbeat packets to determine the stable heartbeat interval

Figure 11C

METHOD AND SYSTEM FOR HEARTBEAT ADAPTATION

PRIORITY CLAIM AND RELATED APPLICATION

This application is a continuation application of PCT Patent Application No. PCT/CN2015/070346, entitled "METHOD AND SYSTEM FOR HEARTBEAT ADAPTATION" filed on Jan. 8, 2015, which claims priority to Chinese Patent Application No. 201410298978.0, entitled "METHOD AND SYSTEM FOR INTELLIGENT HEARTBEAT SURVIVAL" filed on Jun. 26, 2014, both of which are incorporated by reference in their entirety.

TECHNICAL FIELD

The present disclosure relates to the field of Internet technologies, and in particular, to a method and system for performing a heartbeat adaptation process.

BACKGROUND

In current network technologies, in the case of mobile communication, an IP address assigned by an operator to a mobile terminal is an IP address of the operator's intranet because IPv4 has a finite number of IP addresses. When the mobile terminal requires networking resources, Network Address Translation (NAT) is performed through a gateway of the operator, so as to implement network communication of the mobile terminal. To be able to ensure effective application of the IP address of the intranet, gateways of most mobile network operators at present may eliminate corresponding entries in a NAT table in a period of time when there is no data communication on a communication link, causing interruption of the communication link, and the mobile terminal may not perceive that the communication link is interrupted. This is commonly referred to as NAT aging. To be able to keep alive a connection between the mobile terminal and a background server, a client needs to send an application-layer-defined protocol packet to the server, called a heartbeat or heartbeat packet. Intelligent heartbeat means dynamically adjusting the frequency of the heartbeat according to the type of network and the stability of the network to keeping a network link alive for as long as possible, dynamically decrease the frequency of the heartbeat, and reduce consumption of network resources.

As an example of current intelligent heartbeat keep-alive technologies, Google Cloud Message (GCM) keeps alive network links by distinguishing network types and respectively using different heartbeats at a fixed interval with respect to the different types of networks. For example, a 15-minute heartbeat interval is used in the case of Wi-Fi, and a 28-minute heartbeat interval is used in the case of a data network. Other mobile terminal applications all also use a fixed heartbeat strategy, and typical heartbeat values include 3 minutes and 20 seconds, 4 minutes and 30 seconds, 4 minutes and 45 seconds, 7 minutes, 15 minutes, 28 minutes, and so on.

SUMMARY

At least the following problem(s) exist in the prior art: Current mobile terminal heartbeat keep-alive technologies mostly use a fixed heartbeat interval. Although it is relatively simple to implement these technologies, adaptability to the network is poor. For example, if a shorter heartbeat interval is used, it will lead to a waste of electricity and network resources. But, if a longer heartbeat interval is used, a connection cannot be kept alive for long and interruption of a communication connection cannot be perceived in time, resulting in messages that are not received in time.

In some embodiments, a method of performing a heartbeat adaptation process is performed at a computing device (e.g., client device 104, FIGS. 1 and 3) with one or more processors and memory. The method includes detecting a condition for initiating the heartbeat adaptation process in accordance with one or more predetermined criteria. In response to detecting the condition, the method includes performing the heartbeat adaptation process. As part of the heartbeat adaptation process, the method includes sending, to a server, one or more first heartbeat test packets according to a predefined time interval. In accordance with a determination that the one or more first heartbeat test packets satisfy one or more test continuation criteria, the method includes: increasing the predefined time interval according to a predetermined interval step; and repeating the heartbeat adaptation process using the increased predefined time interval. In accordance with a determination that the one or more first heart test packages satisfy one or more test termination criteria, the method includes: identifying a stable heartbeat interval according to the predefined time interval; and terminating the heartbeat adaptation process.

In some embodiments, a computing device (e.g., server system 108, FIGS. 1-2; client device 104, FIGS. 1 and 3; or a combination thereof) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., server system 108, FIGS. 1-2; client device 104, FIGS. 1 and 3; or a combination thereof) with one or more processors, cause the computing device to perform, or control performance of, the operations of any of the methods described herein. In some embodiments, a computing device (e.g., server system 108, FIGS. 1-2; client device 104, FIGS. 1 and 3; or a combination thereof) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIGS. 11A-11E illustrate a flowchart diagram of a method performing a heartbeat adaptation process in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
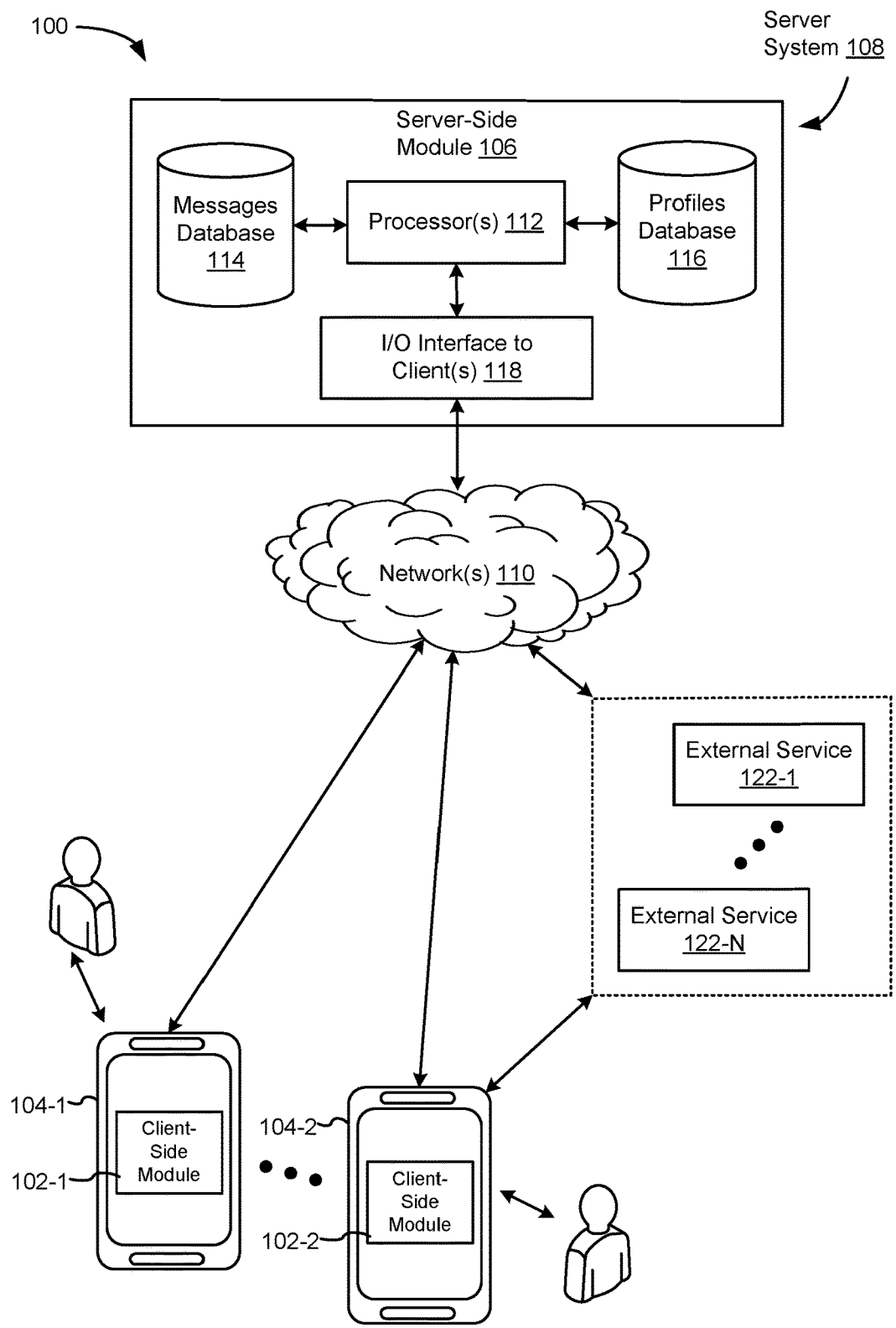
FIG. 1 is a block diagram of a server-client environment in accordance with some embodiments.

As shown in FIG. 1, data processing for a social networking platform is implemented in a server-client environment 100 in accordance with some embodiments. In accordance with some embodiments, server-client environment 100 includes client-side processing 102-1, 102-2 (hereinafter "client-side modules 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking platform and communications with server-side module 106. Server-side module 106 provides server-side functionalities for the social networking platform for any number of client modules 102 each residing on a respective client device 104.

In some embodiments, server-side module 106 includes one or more processors 112, messages database 114, profiles database 116, and an I/O interface to one or more clients 118. I/O interface to one or more clients 118 facilitates the client-facing input and output processing for server-side module 106. In some embodiments, processor(s) 112 route messages from client devices to recipients within the social networking platform and respond to heartbeat packets. Messages database 114 stores messages sent by users in the social networking platform, and profiles database 116 storing user profiles for users of the social networking platform.

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an eBook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108. In some embodiments, server system 108 includes, but is not limited to, a handheld computer, a tablet computer, a laptop computer, a desktop computer, or a combination of any two or more of these data processing devices or other data processing devices.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client-server environment 100 can vary in different embodiments. For example, in some embodiments, client-side module 102 is a thin-client that provides only user-facing input and output processing functions, and delegates all other data processing functionalities to a backend server (e.g., server system 108). Although many aspects of the present technology are described from the perspective of server system 108, the corresponding actions performed by client device 104 would be apparent to ones skilled in the art without any creative efforts. Furthermore, some aspects of the present technology may be performed by server system 108, client device 104, or server system 108 and client device 104 cooperatively.

In some embodiments, the one or more external services 122 are network access points, networking routers, DNS services, Internet service providers, application hosting, web hosting, cloud-based services, such as video and/or image hosting and storage websites, or the like. In some embodiments, client devices 104 access one or more networks 110 via external services 122. For example, a respective external service 122 is a network access point or a DNS service.

Figure 2:
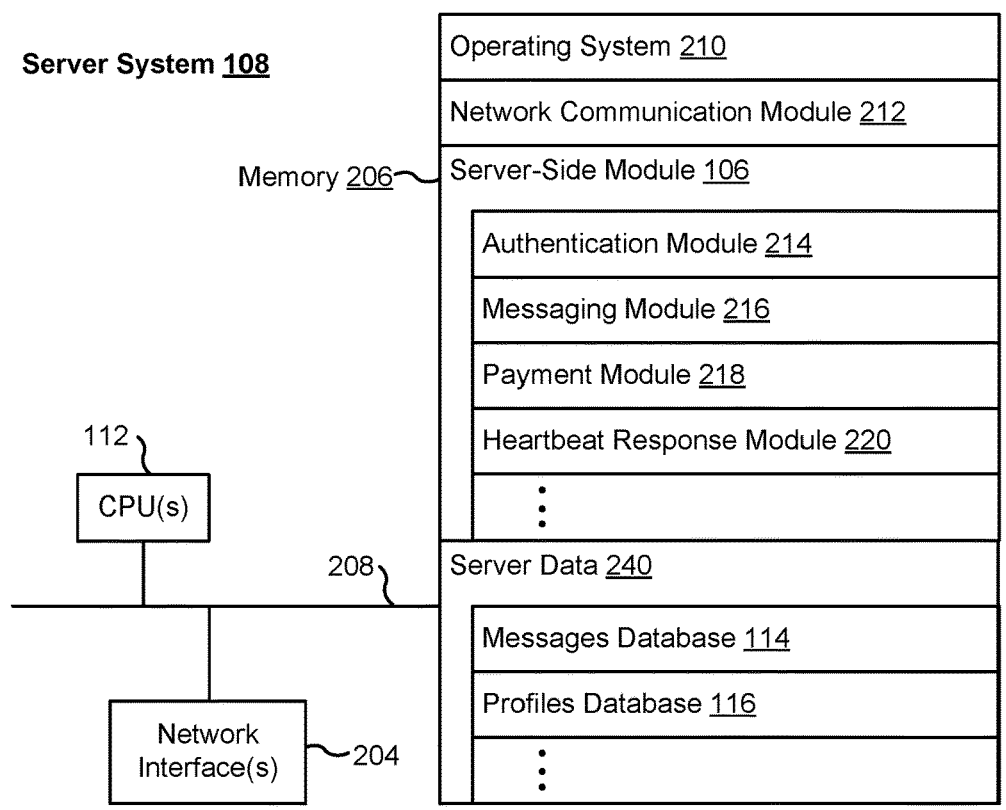
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104) connected to one or more networks 110 via one or more network interfaces 204 (wired or wireless);
- server-side module 106, which provides server-side data processing and functionalities for the social networking platform, including but not limited to:
  - authentication module 214 for performing an authentication process to validate a user account to access the social networking platform;
  - messaging module 216 for managing and routing messages sent between users of the social networking platform;
  - (optional) payment module 218 for processing transactions for a respective user of the social networking platform based on payment data in a user profile in profiles database 116 corresponding to the respective use; and
  - heartbeat response module 220 for responding to heartbeat packets from client devices 104 so as to maintain a data connection with a respective client device 104; and
- server data 240 storing data for the social networking platform, including but not limited to:
  - messages database 114 storing messages sent by users in the social networking platform; and
  - profiles database 116 storing user profiles for users of the social networking platform, where a respective user profile for a user includes a user identifier (e.g., an account name or handle), login credentials to the social networking platform, (optionally) payment data (e.g., linked credit card information, app credit or gift card balance, billing address, shipping address, etc.), an IP address or preferred contact information, group chat(s) subscribed to, contacts list (i.e., followed public and private accounts), custom parameters for the user (e.g., age, location, hobbies, etc.), and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
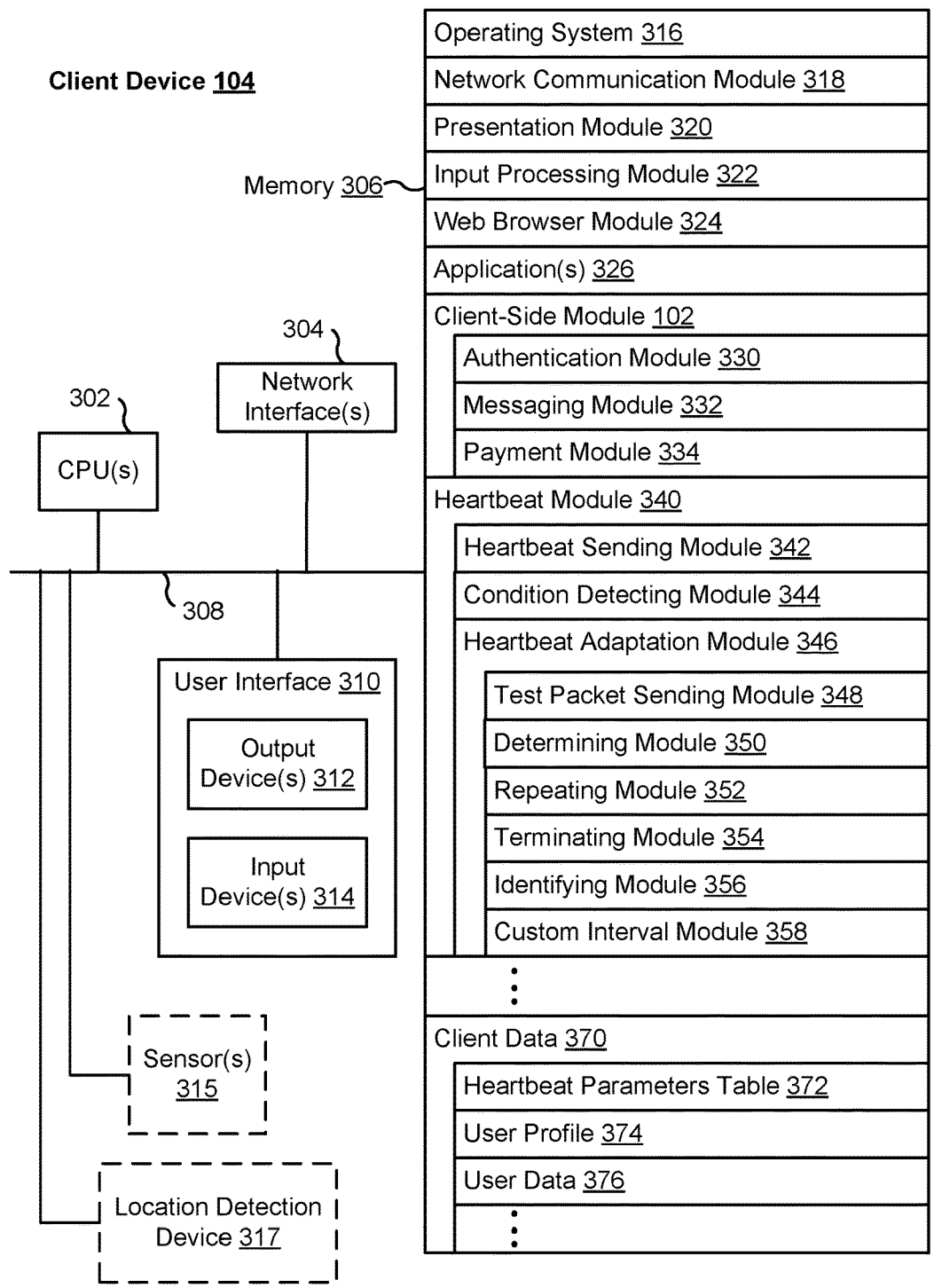
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. In some embodiments, client device 104 optionally includes one or more sensors 315, which provide context information as to the current state of client device 104 or the environmental conditions associated with client device 104. Sensor(s) 315 include but are not limited to one or more microphones, one or more cameras, an ambient light sensor, one or more accelerometers, one or more gyroscopes, a temperature sensor, one or more motion sensors, one or more biological sensors (e.g., a galvanic skin resistance sensor, a pulse oximeter, and the like), and other sensors. In some embodiments, client device 104 optionally includes a location detection device 317, such as a GPS (global positioning satellite) or other geo-location receiver, for determining the location of client device 104.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting client device 104 to other computing devices (e.g., server system 108 and one or more external services 122) connected to one or more networks 110 via one or more network interfaces 304 (wired or wireless);

presentation module 320 for enabling presentation of information (e.g., a user interface for application(s) 326 or the social networking platform, widgets, websites and web pages thereof, and/or games, audio and/or video content, text, etc.) at client device 104 via one or more output devices 312 (e.g., displays, speakers, etc.) associated with user interface 310;

input processing module 322 for detecting one or more user inputs or interactions from one of the one or more input devices 314 and interpreting the detected input or interaction;

web browser module 324 for navigating, requesting (e.g., via HTTP), and displaying websites and web pages thereof;

one or more applications 326 for execution by client device 104 (e.g., games, application marketplaces, payment platforms, and/or other web or non-web based applications);

client-side module 102, which provides client-side data processing and functionalities for the social networking platform, including but not limited to:

authentication module 330 for authenticating the user of client device 104 to access his/her respective user account in the social networking platform;

messaging module 332 for sending messages to and receiving messages from other users of the social networking platform (e.g., instant messaging, group chat, message board, message/news feed, and the like); and (optional) payment module 334 for processing payments associated with transactions initiated within the social networking platform or at a merchant's website within web browser module 324;

heartbeat module 340 for sending heartbeat packets and performing a heartbeat adaptation process, including but not limited to:

heartbeat sending module 342 for sending heartbeat packets to server system 108 to maintain a data connection or to external services 122 to maintain a network connection or a stable IP address;

condition detecting module 344 for detecting a condition for initiating the heartbeat adaptation process;

heartbeat adaptation module 346 for performing a heartbeat adaptation process to adjust the frequency of the heartbeat packets sent by heartbeat sending module 342 in response to condition detecting module 344 detecting the condition, including but not limited to:

test packet sending module 348 for sending, to a server (e.g., server system 108 or one of external services 122), one or more first heartbeat test packets according to a predefined time interval;

determining module 350 for determining whether the one or more first heartbeat test packets satisfy one or more test continuation criteria or one or more test termination criteria;

repeating module 352 for increasing the predefined time interval according to a predetermined interval step and repeating the heartbeat adaptation process using the increased predefined time interval in accordance with a determination by determining module 350 that the one or more first heartbeat test packets satisfy the one or more test continuation criteria;

identifying module 354 for identifying a stable heartbeat interval according to the predefined time interval in accordance with a determination by determining module 350 that the one or more first heart test packages satisfy the one or more test termination criteria;

terminating module 356 for terminating the heartbeat adaptation process after identifying module 354 identifies the stable heartbeat interval; and custom interval module 358 for determining a respective time interval preferred by client device 104 based on one or more parameters, prompting approval of the respective time interval preferred by client device 104, and setting the respective time interval as the stable heartbeat interval if the respective time interval is approved; and client data 370 storing data, including, but is not limited to:

heartbeat parameters table 372 storing parameters related to the heartbeat packet frequency and the heartbeat adaptation process such as a predefined time interval, a predetermined interval step, a stable heartbeat interval, a value of a heartbeat failure counter, a value of a heartbeat success counter, a preferred time interval, and the like;

user profile 374 storing a user profile for the user of client device 104, including, but not limited to, a user identifier (e.g., an account name or handle), login credentials to the social networking platform, (optionally) payment data (e.g., linked credit card information, app credit or gift card balance, billing address, shipping address, etc.), an IP address or preferred contact information, group chat(s) subscribed to, contacts list (i.e., followed public and private accounts), custom parameters for the user (e.g., age, location, hobbies, etc.), and identified trends and/or likes/dislikes of the user; and user data 376 storing data authored, saved, liked, or chosen as favorites by the user of client device 104 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4:
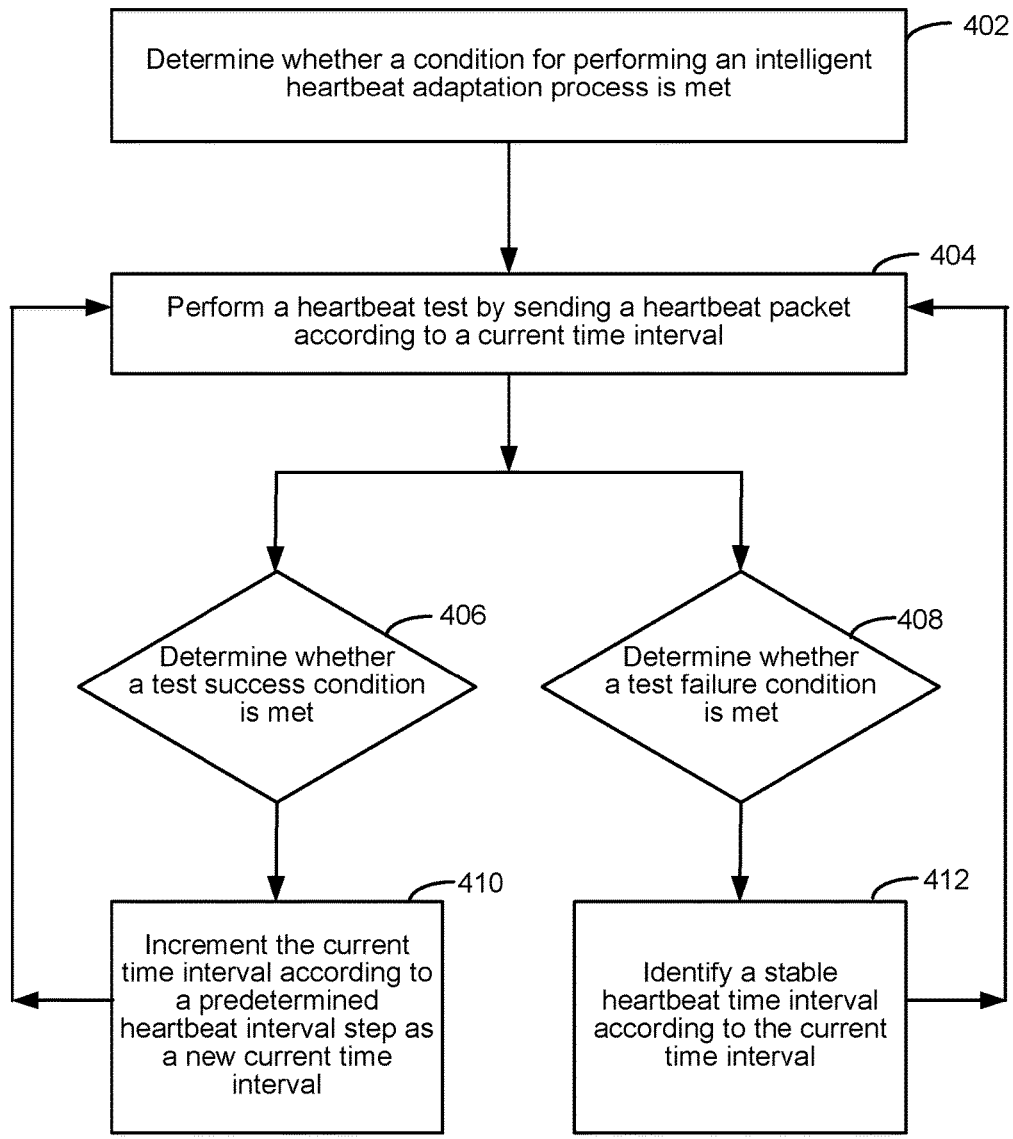
FIG. 4 illustrates a flowchart diagram of a method of intelligent heartbeat adaptation in accordance with some embodiments.

FIG. 4 illustrates a flowchart diagram of a method 400 of intelligent heartbeat adaptation in accordance with some embodiments. In some embodiments, method 400 is performed by a computing device with one or more processors and memory. For example, in some embodiments, method 400 is performed by client device 104 (FIGS. 1 and 3) or a component thereof (e.g., heartbeat module 340, FIGS. 1 and 3). In some embodiments, method 400 is governed by instructions that are stored in a non-transitory computer readable storage medium and the instructions are executed by one or more processors of the computing device.

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3). In some embodiments, client devices 104 send heartbeat signals to server system 108 maintain a data connection (e.g., a UDP or TCP connection) or access with the social networking platform.

In some embodiments, client devices 104 access one or more networks 110 via external services 122. For example, a respective one of external services 122 is a network access point or a DNS service. In some embodiments, client devices 104 send heartbeat signals to one of external services 122 to maintain a network connection or a stable IP address.

In some embodiments, the computing device determines (402) whether a condition for performing an intelligent heartbeat adaption process is met. In accordance with a determination that the condition is met, method 400 continues to operation 404. In accordance with a determination that the condition is not met, method 400 repeats operation 402.

In some embodiments, the computing device performs (404) a heartbeat test by sending a heartbeat packet according to a current time interval. For example, the current time interval is the predefined time interval stored in heartbeat parameters table 372 (FIG. 3) and is a minimum time interval or a previously determined time interval.

In some embodiments, the computing device determines (406) whether a test success condition is met. In accordance with a determination that the test success condition is method, method 400 continues to operation 410.

In some embodiments, the computing device increments (410) the current time interval according to a predetermined heartbeat interval step as a new current time interval. Subsequently, method 400 repeats operation 404 by sending another heartbeat packet according to the new current time interval.

In some embodiments, the computing device determines (408) whether a test failure condition is met. In accordance with a determination that the test failure condition is method, method 400 continues to operation 412.

In some embodiments, the computing device identifies (412) a stable heartbeat time interval according to the current time interval.

In method 400, by monitoring a condition for performing an intelligent heartbeat adaption process and adjusting the heartbeat tie interval according to a heartbeat interval step until a proper stable heartbeat time interval is found, not only does method 400 obtain a heartbeat time interval that is as long as possible in keeping a network connection based on the current network environment, but it can also save electricity and network resources to some extent as the heartbeat time interval is as long as possible.

It should be understood that the particular order in which the operations in FIG. 4 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 600, 700, 900, 1000, and 1100) are also applicable in an analogous manner to method 400 described above with respect to FIG. 4.

Figure 5:
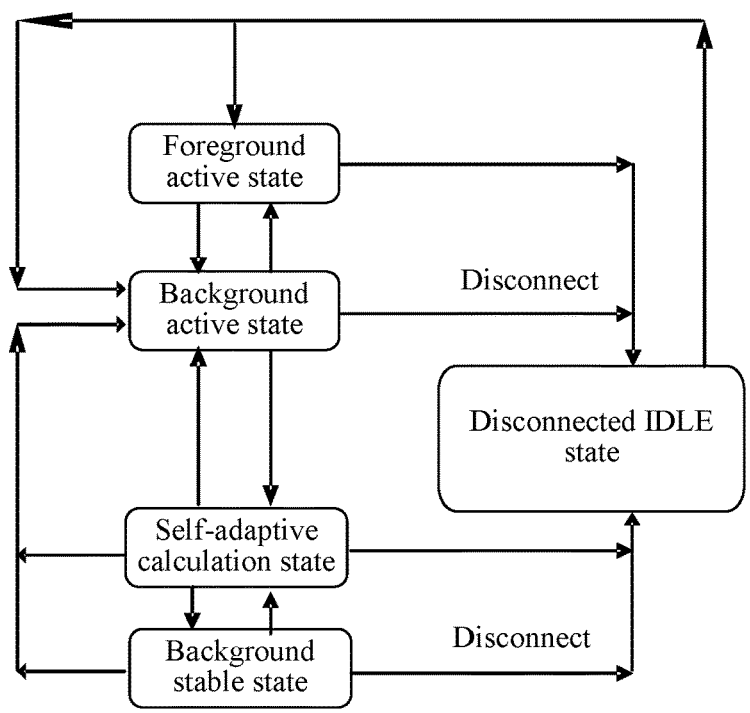
FIG. 5 illustrates a schematic diagram of a process of switching between states in accordance with some embodiments.

In some embodiments, the computing device (e.g., client device 104, FIGS. 1 and 3) operates in different states according to different specific situations. FIG. 5 is a schematic diagram of a process of switching between states. The example in FIG. 5 shows five states in total: a foreground active state, a background active state, a self-adaptive calculation state, a background stable state, and a disconnected IDLE state.

In some embodiments, the computing device (e.g., client device 104, FIGS. 1 and 3) is in the foreground active state when the application (e.g., the social networking platform such as client-side module 102, FIGS. 1 and 3) is in the foreground and the screen is active. In the foreground active state, a heartbeat packet can be sent with a preset minimum heartbeat time interval. In a specific example, the preset minimum heartbeat time interval is set to 4.5 minutes.

In some embodiments, the computing device (e.g., client device 104, FIGS. 1 and 3) is in the background active state when the application switches to the background or the screen of the computing device is inactive (i.e., off). The background active state is a transition state between the foreground active state and the self-adaptive calculation state, to try to select an inactive time period for self-adaptive heartbeat calculation, and to reduce the impact of untimely receiving of messages possibly caused by the self-adaptive heartbeat calculation. If the factor of time consumed by the self-adaptive heartbeat calculation is not taken into account, it is feasible that the background active state is not set. In a specific example of the present application, the background active state can send a heartbeat packet with a preset minimum heartbeat time interval the same as that of the foreground active state, and maintain a long connection for a predetermined time period. The predetermined time period can be set according to actual demands, such as 30 minutes. In another specific example, the background active state can send a heartbeat packet with a preset minimum heartbeat time interval the same as that of the foreground active state, and when sending of the heartbeat packet successively succeeds a first predetermined number of times of success, it can be determined that the network is still in a stable state after sending of the heartbeat packet successively succeeds the first predetermined number of times of success, and then proceed to the subsequent self-adaptive calculation state.

In some embodiments, the self-adaptive calculation state refers to a process of performing an intelligent heartbeat adaption process to ultimately obtain a stable heartbeat time interval (e.g., operations 404-412 of method 400).

In some embodiments, the computing device (e.g., client device 104, FIGS. 1 and 3) is in the background stable state when the maximum heartbeat time interval (i.e., stable heartbeat time interval) has been found from the self-adaptive calculation state, and the heartbeat is maintained with the stable heartbeat time interval.

In some embodiments, the computing device (e.g., client device 104, FIGS. 1 and 3) is in the disconnected IDLE state when the application is disconnected and is no longer sending heartbeats.

The five states do not exist in isolation from each other, and mutual switching can be performed between the states in actual application scenarios. As shown in FIG. 5, the foreground active state and the background active state can switch to each other, and the self-adaptive calculation state and the background stable state can switch to each other. After disconnection, switching can be performed from the foreground active state, the background active state, the self-adaptive calculation state and the background stable state to the disconnected IDLE state. In the case of disconnection, if the application is in the foreground and is networked in the event that the screen of the terminal is on, switching can be performed from the disconnected IDLE state to the foreground active state. In the case of disconnection, if the application is in the background or is networked in the event that the screen of the terminal is off, switching can be performed from the disconnected IDLE state to the background active state. In the self-adaptive calculation state and the background stable state, if a new message is received, switching can be performed to the background active state. In the following description about each specific example, detailed description is provided in combination with the specific states.

The intelligent heartbeat self-adaption calculation condition can be set differently for different situations (e.g., see operation 402 of method 400). In one manner, it can be judged that the intelligent heartbeat self-adaption calculation condition is met when it is monitored that the application is in a background state or the terminal is in a foreground off-screen state. So, an inactive time period of the application can be selected as far as possible, to reduce the impact of untimely receiving of messages possibly generated during the self-adaptive heartbeat calculation. In another manner, it can be judged that the intelligent heartbeat self-adaption calculation condition is met when a heartbeat packet is sent with a stable heartbeat time interval and sending of the heartbeat packet successively fails a predetermined number of times of failure. The predetermined number of times of failure herein can be set differently based on actual demands. In a specific example, the predetermined number of times of failure can be set to 5 times.

In addition, to be able to ensure the intelligent heartbeat self-adaption calculation in the case of a stable network, after it is monitored that the intelligent heartbeat self-adaption calculation condition is met, it is also feasible to proceed to the step of performing a heartbeat test with a current heartbeat time interval after it is determined that the network is in a stable state. That the network is in a stable state can be determined in different manners based on actual application demands. In one manner, after it is monitored that the self-adaption calculation condition is met and after it is maintained for a predetermined time period in a manner of sending a heartbeat packet with a preset minimum heartbeat time interval, it can be considered that the network is in a stable state, and proceed to the step of performing a heartbeat test with a current heartbeat time interval. The predetermined time period can be set according to actual demands. In another manner, after it is monitored that the intelligent heartbeat self-adaption calculation condition is met and when a heartbeat packet is sent with a preset minimum heartbeat time interval and sending of the heartbeat packet successively succeeds a predetermined number of times of success, it can be considered that the network is in a stable state, and proceed to the step of performing a heartbeat test with a current heartbeat time interval. The predetermined number of times of success herein can be set according to actual demands. In a specific embodiment of the present application, the first predetermined number of times of success can be set to 3 times.

In another implementation manner, after it is monitored that the self-adaption calculation condition is met, a current heartbeat time interval is set to a preset minimum heartbeat time interval, and then proceed to the step of performing a heartbeat test with the current heartbeat time interval.

For the heartbeat test success condition, different settings can be made. In one manner, it can be judged that the test success condition is met when a heartbeat test is performed with the current heartbeat time interval and the test succeeds. That is, it can be judged that the test success condition is met as long as the heartbeat test performed with the current heartbeat time interval succeeds once. In another manner, it can be judged that the test success condition is met when a heartbeat test is performed a predetermined number of times of test with the current heartbeat time interval and a success rate is greater than or equal to a predetermined success rate threshold. The predetermined number of times of test herein can be set according to actual demands, such as 20 times or 30 times. The success rate herein is a ratio of the number of times of success of the heartbeat test to the total number of times of the heartbeat test, and the predetermined success rate threshold herein can be set according to actual demands, such as 70%, 80% or 90%. In the case of very high requirements, the predetermined success rate threshold can even be set to a larger value. In another manner, it can be judged that the test success condition is met when a heartbeat test is performed with the current heartbeat time interval and the heartbeat test successively succeeds a second number of times of success.

Correspondingly, different settings can also be made for the heartbeat test failure condition. In one manner, it can be judged that the test failure condition is met when a heartbeat test is performed with the current heartbeat time interval and the number of times of failure of the heartbeat test is accumulated to a first predetermined number of times of failure. In another manner, it can be judged that the heartbeat test failure condition is met when a heartbeat test is performed a predetermined number of times of test with the current heartbeat time interval and a success rate is less than a predetermined success rate threshold.

Figure 6:
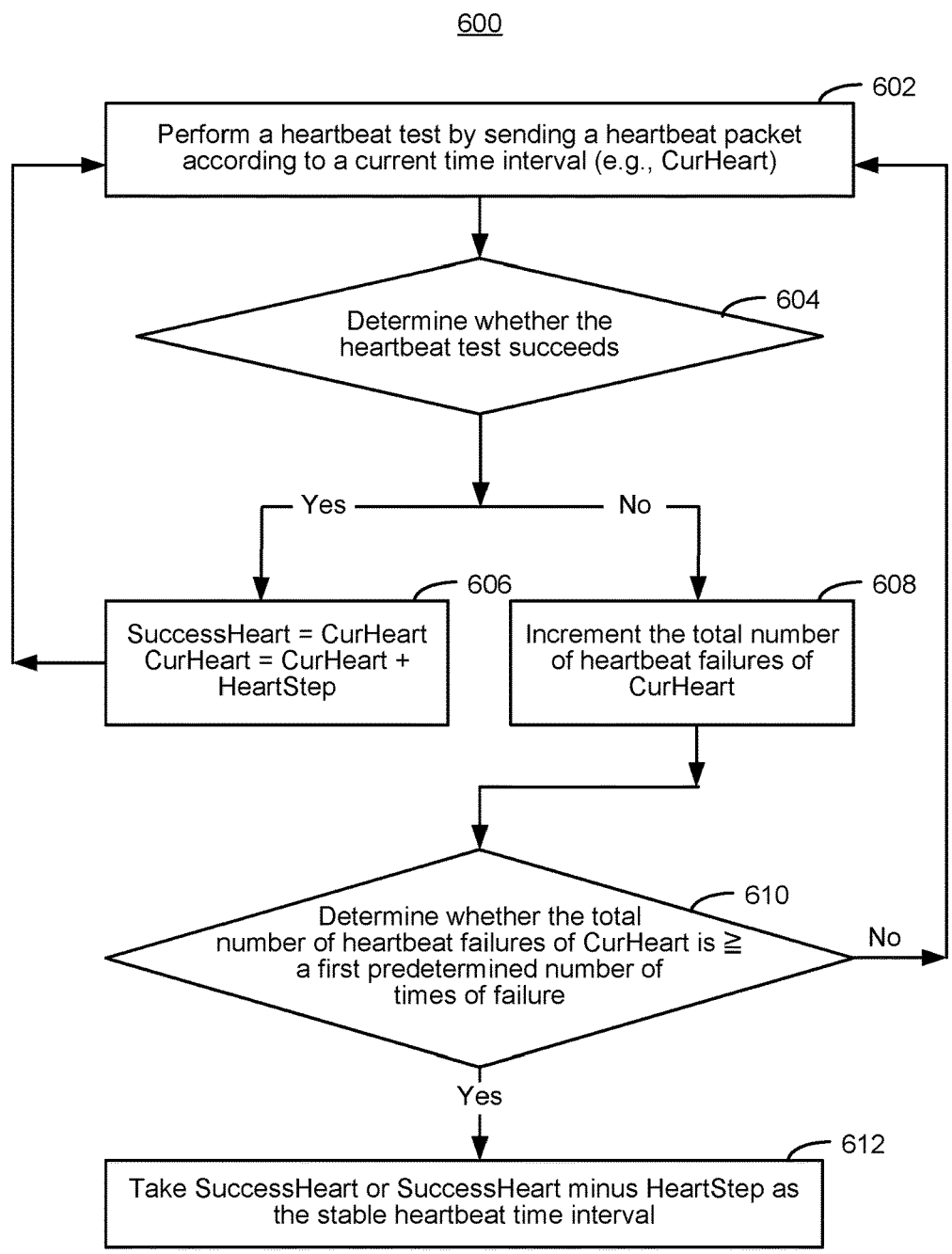
FIG. 6 illustrates a flowchart diagram of a method of intelligent heartbeat adaptation in accordance with some embodiments.

FIG. 6 illustrates a flowchart diagram of a method 600 of intelligent heartbeat adaptation in accordance with some embodiments. In some embodiments, method 600 is performed by a computing device with one or more processors and memory. For example, in some embodiments, method 600 is performed by client device 104 (FIGS. 1 and 3) or a component thereof (e.g., heartbeat module 340, FIGS. 1 and 3). In some embodiments, method 400 is governed by instructions that are stored in a non-transitory computer readable storage medium and the instructions are executed by one or more processors of the computing device.

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3). In some embodiments, client devices 104 send heartbeat signals to server system 108 maintain a data connection (e.g., a UDP or TCP connection) or access with the social networking platform.

In some embodiments, client devices 104 access one or more networks 110 via external services 122. For example, a respective one of external services 122 is a network access point or a DNS service. In some embodiments, client devices 104 send heartbeat signals to one of external services 122 to maintain a network connection or a stable IP address.

As shown in FIG. 6, SuccessHeart indicates a current success heartbeat time interval, with an initial value of MinHeart. CurHeart indicates a current heartbeat time interval, with an initial value of SuccessHeart. HeartStep indicates a predetermined heartbeat increase step, which, in a specific example, can be selected as 1 minute.

As shown in FIG. 6, in the example, a heartbeat test is performed (602) by sending a heartbeat packet according the current heartbeat time interval (CurHeart). After sending the heartbeat packet, it is determined (604) whether the heartbeat test is successful.

If the heartbeat test succeeds (606), it indicates that the test success condition is met, the current heartbeat time interval CurHeart is set to the current success heartbeat time interval SuccessHeart, and a value obtained with the current heartbeat time interval CurHeart plus the predetermined heartbeat increase step HeartStep is taken as a new current heartbeat time interval, to return to perform the heartbeat test again (602).

If the heartbeat test fails (608), the number of times of heartbeat failure of the current heartbeat time interval CurHeart is incremented by one, and it is determined (610) whether the number of times of heartbeat failure of the current heartbeat time interval CurHeart is greater than or equal to a first predetermined number of times of failure is judged.

If yes (612), it indicates that the test failure condition is met, the self-adaptive adjustment process ends, and a value obtained by subtracting the predetermined heartbeat increase step HeartStep from the current success heartbeat time interval SuccessHeart (i.e., CurHeart-HeartStep) or the current heartbeat time interval is taken as a stable heartbeat time interval.

Method 600 proceeds to the background stable state, and in the background stable state, a heartbeat packet is sent directly with the stable heartbeat time interval. In order to avoid being possibly close to a critical value of a heartbeat time interval when the current success heartbeat time interval SuccessHeart is directly set to the stable heartbeat time interval, thus affecting the success rate of sending the heartbeat packet and stability of keeping heartbeat alive, as shown in FIG. 6. It is also feasible to take a difference (i.e., SuccessHeart—HeartStep) obtained by subtracting a preset stable heartbeat step HeartStep from the current success heartbeat time interval SuccessHeart as the stable heartbeat time interval. If the number of times of heartbeat failure of the current heartbeat time interval CurHeart is less than the first predetermined number of times of failure, it indicates that the test failure condition has not yet been met, and return to perform the heartbeat test again.

The description about adaptively determining a stable heartbeat time interval shown in FIG. 6 is given by considering that the test success condition is met when the heartbeat test succeeds once. In specific applications, it may also be considered that the test success condition is met only when the number of times of the heartbeat test totals or successively reaches a predetermined number of times.

After the stable heartbeat time is determined, the computing device enters the background stable state. When a heartbeat packet is sent with the stable heartbeat time interval, due to changes in a network environment or the like, it is likely to return to the self-adaptive calculation state from the background stable state. Thus, FIG. 6 is a schematic flowchart of dynamic adjustment when a heartbeat packet is sent with a stable heartbeat time interval in a specific example. In the example, the stable heartbeat time interval is indicated with SuccessHeart, MinHeart indicates a preset minimum heartbeat time interval, and CurHeart indicates a current heartbeat time interval.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 400, 700, 900, 1000, and 1100) are also applicable in an analogous manner to method 600 described above with respect to FIG. 6.

Figure 7:
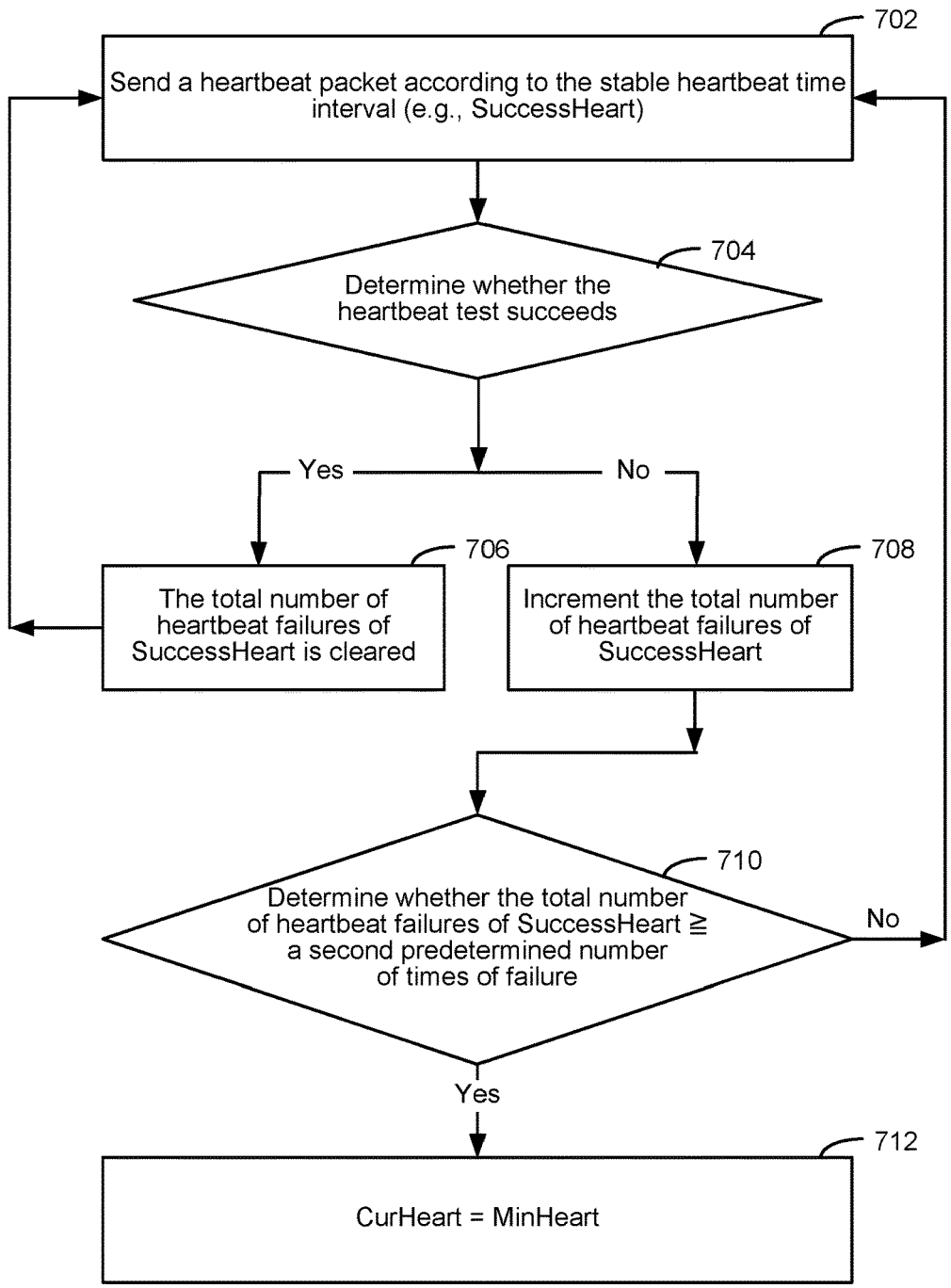
FIG. 7 illustrates a flowchart diagram of a method of intelligent heartbeat adaptation in accordance with some embodiments.

FIG. 7 illustrates a flowchart diagram of a method 700 of intelligent heartbeat adaptation in accordance with some embodiments. In some embodiments, method 700 is performed by a computing device with one or more processors and memory. For example, in some embodiments, method 700 is performed by client device 104 (FIGS. 1 and 3) or a component thereof (e.g., heartbeat module 340, FIGS. 1 and 3). In some embodiments, method 700 is governed by instructions that are stored in a non-transitory computer readable storage medium and the instructions are executed by one or more processors of the computing device.

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3). In some embodiments, client devices 104 send heartbeat signals to server system 108 maintain a data connection (e.g., a UDP or TCP connection) or access with the social networking platform.

In some embodiments, client devices 104 access one or more networks 110 via external services 122. For example, a respective one of external services 122 is a network access point or a DNS service. In some embodiments, client devices 104 send heartbeat signals to one of external services 122 to maintain a network connection or a stable IP address.

As shown in FIG. 7, in the background stable state, a heartbeat packet is sent (702) according to the stable heartbeat time interval (SuccessHeart). After sending the heartbeat packet, it is determined (704) whether the heartbeat packet is successful.

If sending of the heartbeat packet succeeds (706), the number of times of heartbeat failure of SuccessHeart is cleared, and return to continue sending the heartbeat packet with the stable heartbeat time interval SuccessHeart (702).

If sending of the heartbeat packet fails (708), the number of times of heartbeat failure of SuccessHeart is incremented by one. Subsequently, it is determined (710) whether the number of times of heartbeat failure of SuccessHeart is greater than or equal to a second predetermined number of times of failure.

If the number of times of heartbeat failure of SuccessHeart is greater than or equal to the second predetermined number of times of failure (712), it indicates that the stable heartbeat time interval SuccessHeart is inappropriate, and, thus, it is necessary to perform the intelligent heartbeat self-adaption calculation again. That is, the intelligent heartbeat self-adaption calculation condition is met, and after the current heartbeat time interval CurHeart is set to the preset minimum heartbeat time interval MinHeart, get into the self-adaptive calculation state, and proceed to the process of performing a heartbeat test with the current heartbeat time interval CurHeart (e.g., as in operations 602-612 of method 600).

If the number of times of heartbeat failure of SuccessHeart is less than the second predetermined number of times of failure, it indicates that it is insufficient temporarily to judge whether the stable heartbeat time interval SuccessHeart is appropriate, and return to continue sending the heartbeat packet with the stable heartbeat time interval SuccessHeart (702). The second predetermined number of times of failure can be set based on actual demands, and in a specific example of the present application, the second predetermined number of times of failure can be set to 5 times.

Thus, in the background stable state, only when the number of times of successive failure the heartbeat packet is sent with the stable heartbeat time interval reaches the second predetermined number of times of failure, the background stable state can be judged as untrusted, and it is necessary to get into the self-adaptive calculation state to re-determine the stable heartbeat time interval. In this way, adverse effects caused by fast-changing network environments are avoided, such as subways or trains.

In the example shown in FIG. 7, after the current heartbeat time interval CurHeart is set to the preset minimum heartbeat time interval MinHeart, a delayed heartbeat test can be performed a first predetermined number of times of success at first, and after it is determined that the network is in a stable state, proceed to the self-adaptive calculation process of performing a heartbeat test with the current heartbeat time interval, to try to ensure reliability of the test result. By taking a delayed heartbeat test performed three times as an example, FIG. 7 is a schematic flowchart of an embodiment of a delayed heartbeat test in a specific example.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 400, 600, 900, 1000, and 1100) are also applicable in an analogous manner to method 700 described above with respect to FIG. 7.

Figure 8:
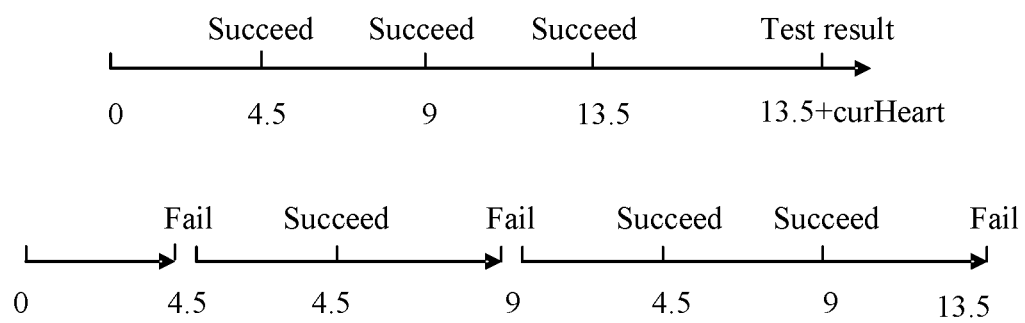
FIG. 8 illustrates an example of dynamic adjustment of a heartbeat packet sent according to a stable heartbeat packet time interval in accordance with some embodiments.

In FIG. 8, a minimum heartbeat time interval of 4.5 minutes is used as an example. As such, in the absence of a stable network environment, heartbeat will be carried out every 4.5 minutes until a three successive successful test condition is met. In the illustration of FIG. 8, description is given with one complete test first, and then description is given with a switching process in the case of absence of a stable test environment. Certainly, a person skilled in the art can understand that, the illustration of FIG. 8 is merely an illustrative explanation, the specific number of times of the delayed heartbeat test may also be set to other times, and the minimum heartbeat time interval may also be set to another value.

The use of a predetermined number of times of the delayed heartbeat test not only eliminates accidental failure and larger network changes (e.g., entering a subway), to make the test result relatively reliable, but also can ensure timeliness of message receiving by performing heartbeat with the preset minimum heartbeat time interval (e.g., 4.5 minutes as shown in FIG. 8) in the case of larger network fluctuations.

When the stable heartbeat time interval is determined according to the current heartbeat time interval, as the heartbeat test of the current heartbeat time interval has failed, indicating that it is unreasonable to send a heartbeat packet with the current heartbeat time interval, the previous current heartbeat time interval can be directly set to the stable heartbeat time interval or a difference obtained by subtracting the predetermined heartbeat increase step from the current heartbeat time interval can be taken as the stable heartbeat time interval.

In order to avoid being possibly close to a critical value of a heartbeat time interval when the previous current heartbeat time interval is directly set to the stable heartbeat time interval, thus affecting the success rate of sending the heartbeat packet and stability of keeping heartbeat alive, in a specific example of the present embodiment, a difference obtained by subtracting the preset stable heartbeat step from the previous current heartbeat time interval can be taken as the stable heartbeat time interval.

According to the present embodiments, when a new connection is established for the application, for the new connection, the heartbeat packet can be sent with the preset minimum heartbeat time interval at first, and after sending of the heartbeat packet with the preset minimum heartbeat time interval successively succeeds a third predetermined number of times of success, the heartbeat packet is sent with the stable heartbeat time interval, so as to send the heartbeat packet with the determined stable heartbeat time interval after the newly-established connection is determined to be in a stable state. The third predetermined number of times of success can be set differently according to actual demands, and in a specific example of the present application, the third predetermined number of times of success can be identical with the first predetermined number of times of success.

Figure 9A:
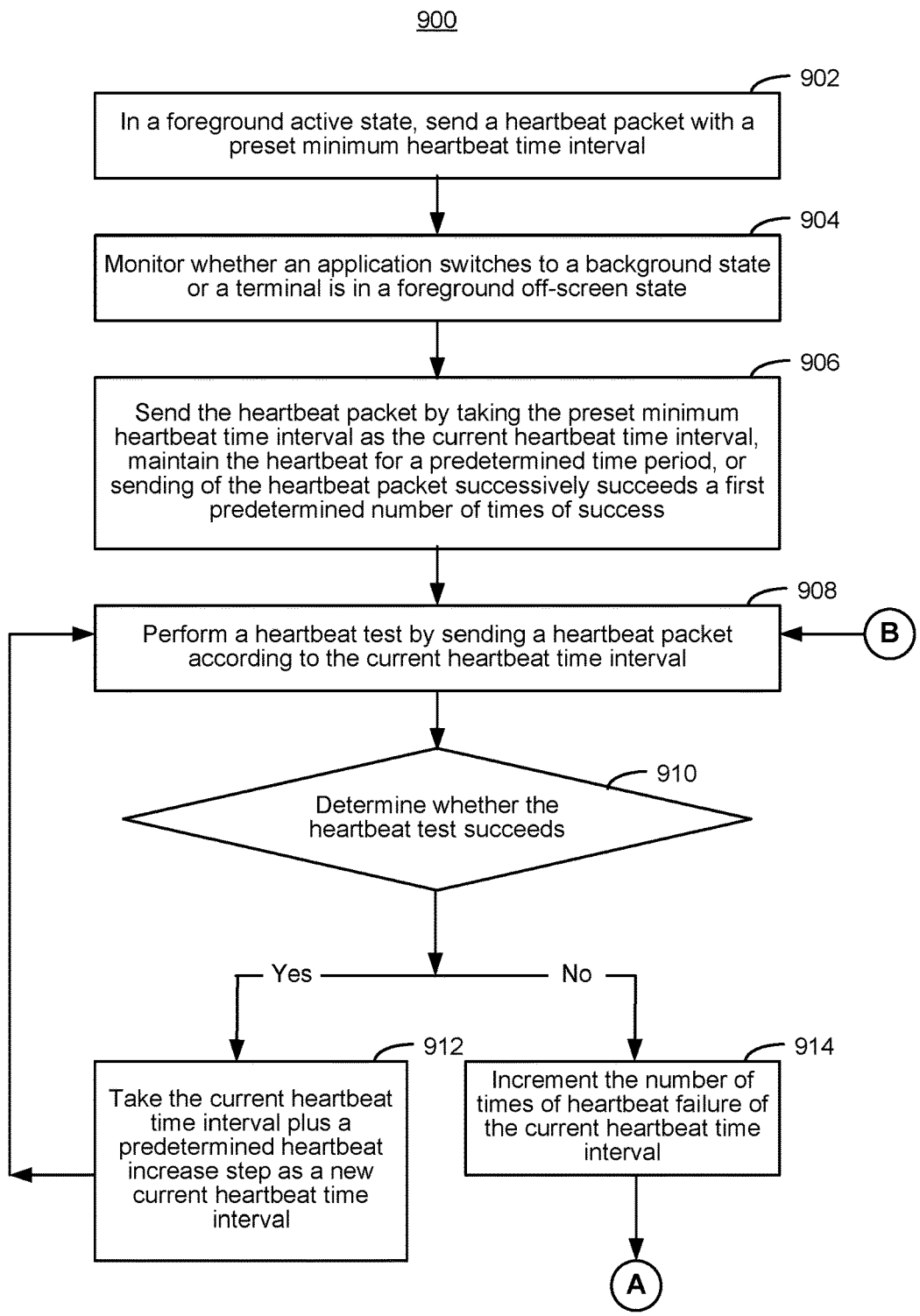
FIGS. 9A-9B illustrate a flowchart diagram of a method of intelligent heartbeat adaptation in accordance with some embodiments.
Figure 9B:
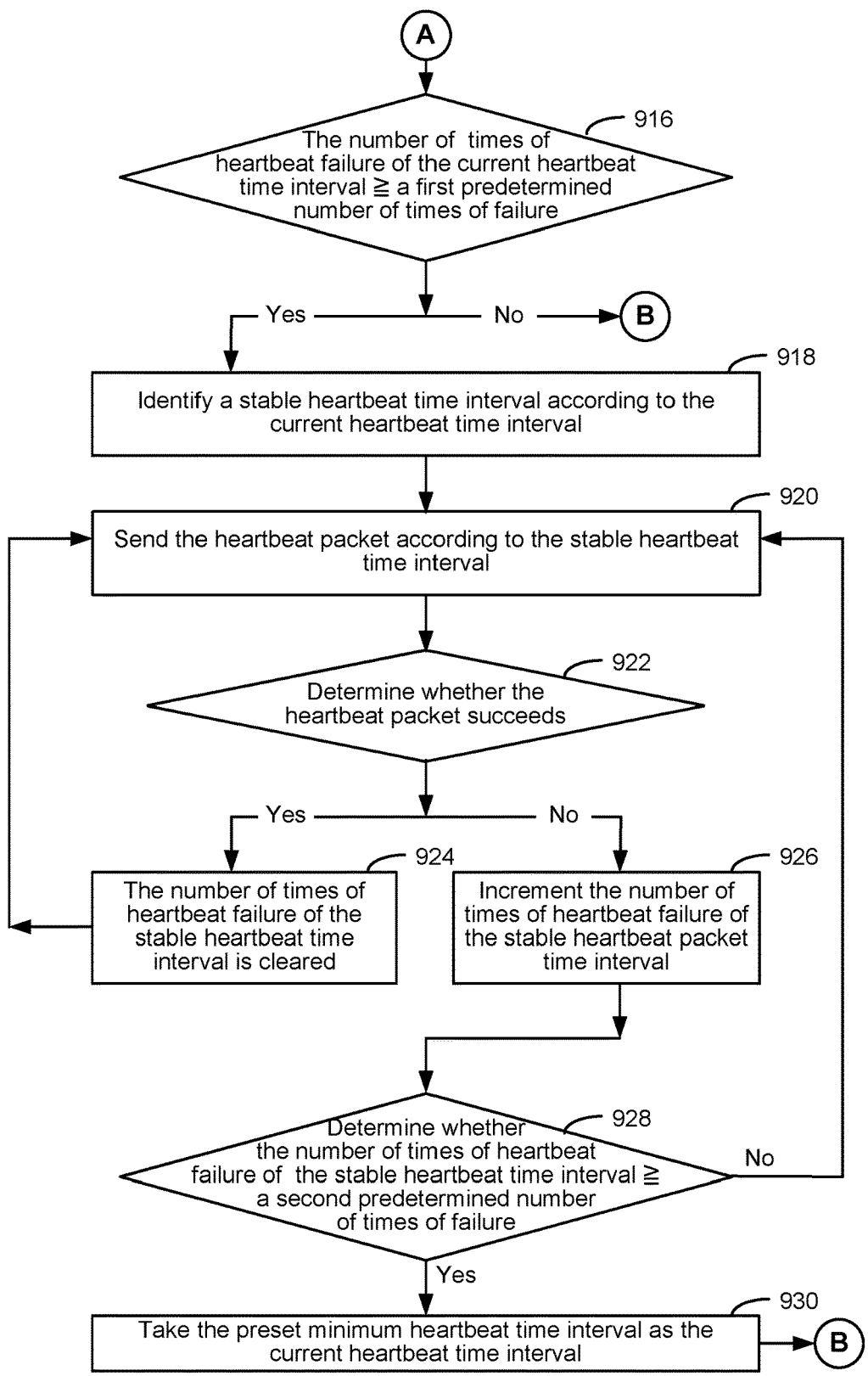

FIGS. 9A-9B illustrate a flowchart diagram of a method 900 of intelligent heartbeat adaptation in accordance with some embodiments. In some embodiments, method 900 is performed by a computing device with one or more processors and memory. For example, in some embodiments, method 900 is performed by client device 104 (FIGS. 1 and 3) or a component thereof (e.g., heartbeat module 340, FIGS. 1 and 3). In some embodiments, method 900 is governed by instructions that are stored in a non-transitory computer readable storage medium and the instructions are executed by one or more processors of the computing device.

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3). In some embodiments, client devices 104 send heartbeat signals to server system 108 maintain a data connection (e.g., a UDP or TCP connection) or access with the social networking platform.

In some embodiments, client devices 104 access one or more networks 110 via external services 122. For example, a respective one of external services 122 is a network access point or a DNS service. In some embodiments, client devices 104 send heartbeat signals to one of external services 122 to maintain a network connection or a stable IP address.

As shown in FIGS. 9A-9B, in the foreground active state, that is, when an application is in the foreground of a terminal and the screen of the terminal is on, a heartbeat packet is sent (902) with a preset minimum heartbeat time interval and the state of the application is monitored (904) continuously.

When it is monitored that the application is in a background state or the terminal is in a foreground off-screen state, the preset minimum heartbeat time interval is taken (906) as a current heartbeat time interval to send the heartbeat packet, and after maintenance for a predetermined time period. Alternatively and/or additionally, after sending of the heartbeat packet by taking the preset minimum heartbeat time interval as the current heartbeat time interval successively succeeds a first predetermined number of times of success, the preset minimum heartbeat time interval is taken (906) as the current heartbeat time interval for a heartbeat test. The heartbeat test is performed (908) by sending a heartbeat packet according to the current heartbeat time interval. Subsequently, is it determined (910) whether the heartbeat test is successful.

If the heartbeat test succeeds (912), it is judged that the test success condition is met, and the current heartbeat time interval plus the predetermined heartbeat increase step is taken as a new current heartbeat time interval, that is, the current heartbeat time interval is progressively increased, and then the process returns to operation 908.

If the heartbeat test fails (914), the number of times of heartbeat failure of the current heartbeat time interval is incremented by one. Subsequently, it is determined (916) whether the number of times of heartbeat failure is greater than or equal to the first predetermined number of times of failure. If no, method 900 returns to operation 908. If yes, the stable heartbeat time interval is identified (918) according to the current heartbeat time interval. In some embodiments, the previous current heartbeat time interval is directly determined as the stable heartbeat time interval, or a value (which is actually the previous current heartbeat time interval) obtained by subtracting the predetermined heartbeat increase step from the current heartbeat time interval can also be determined as the stable heartbeat time interval. In order to avoid a critical value, a difference obtained by subtracting a preset stable heartbeat step from the previous heartbeat time interval can also be taken as the stable heartbeat time interval.

Then, the heartbeat packet is sent (920) according to the stable heartbeat time interval. Subsequently, it is determined (922) whether the heartbeat packet succeeds.

If sending of the heartbeat packet succeeds (924), it indicates that the stable heartbeat time interval is trusted and the number of times of heartbeat failure of the stable heartbeat time interval is cleared. Subsequently, method 900 returns to operation 920.

If sending of the heartbeat packet fails (926), the number of times of heartbeat failure of the stable heartbeat time interval is incremented by one. Subsequently, it is determined (928) whether the number of times of heartbeat failure is greater than or equal to a second predetermined number of times of failure. If no, it indicates that the stable heartbeat time interval is not necessarily untrusted, and returns to operation 920. If yes, it indicates that the stable heartbeat time interval is inappropriate and the current heartbeat time interval is set (930) as the preset minimum heartbeat time interval. Subsequently, method 900 returns to operation 908.

In order to eliminate accidental failure, make the test result relatively reliable, and ensure timeliness of message receiving in the case of larger network fluctuations, after the preset minimum heartbeat time interval is set to the current heartbeat time interval, a delayed heartbeat test can be performed a certain number of times (e.g., 3 times or 5 times) at first, and after the delayed heartbeat test succeeds, proceed to the step of performing the test with the current heartbeat time interval.

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 400, 600, 700, 1000, and 1100) are also applicable in an analogous manner to method 900 described above with respect to FIGS. 9A-9B.

Figure 10A:
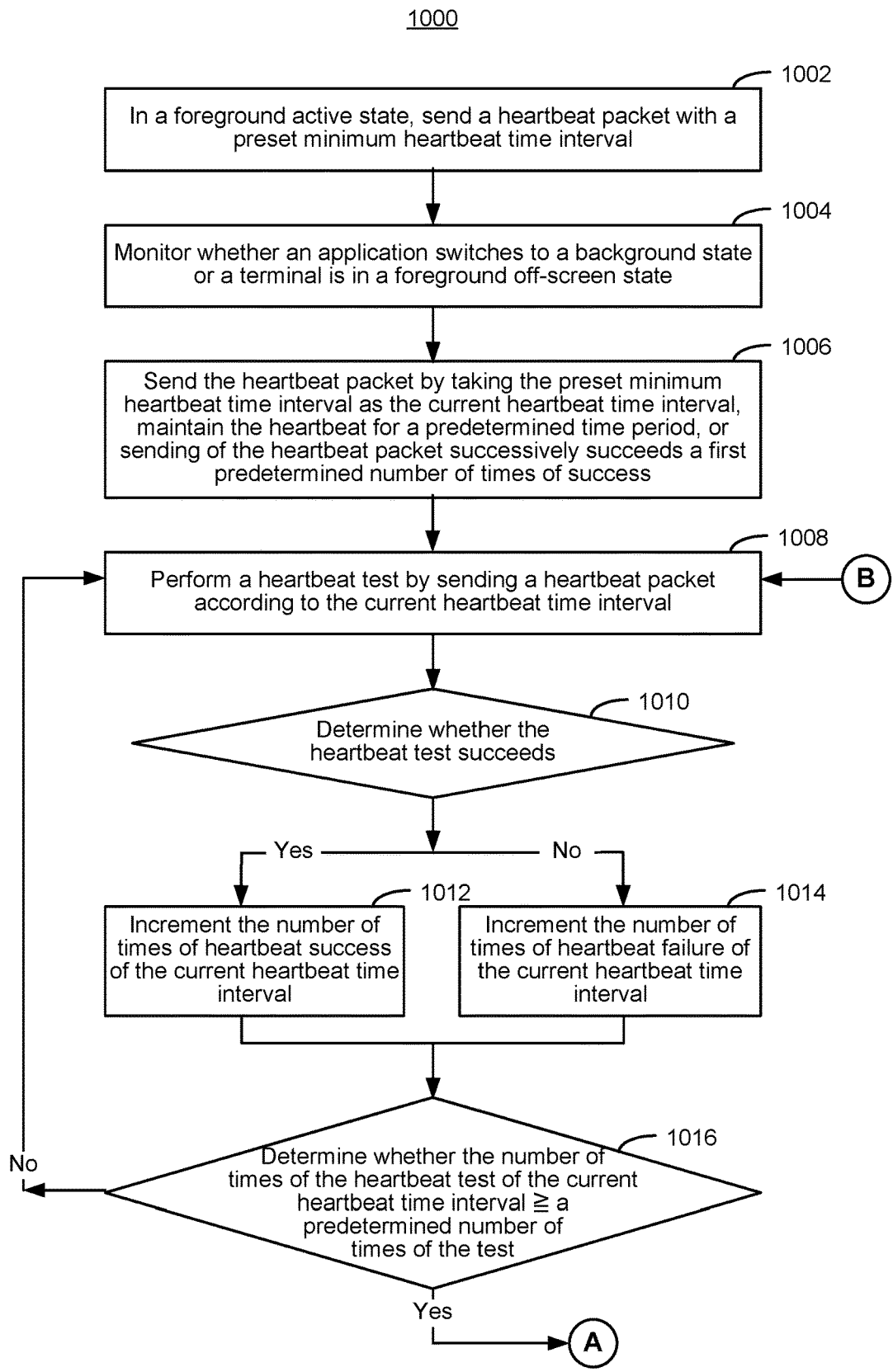
FIGS. 10A-10C illustrate a flowchart diagram of a method of intelligent heartbeat adaptation in accordance with some embodiments.
Figure 10B:
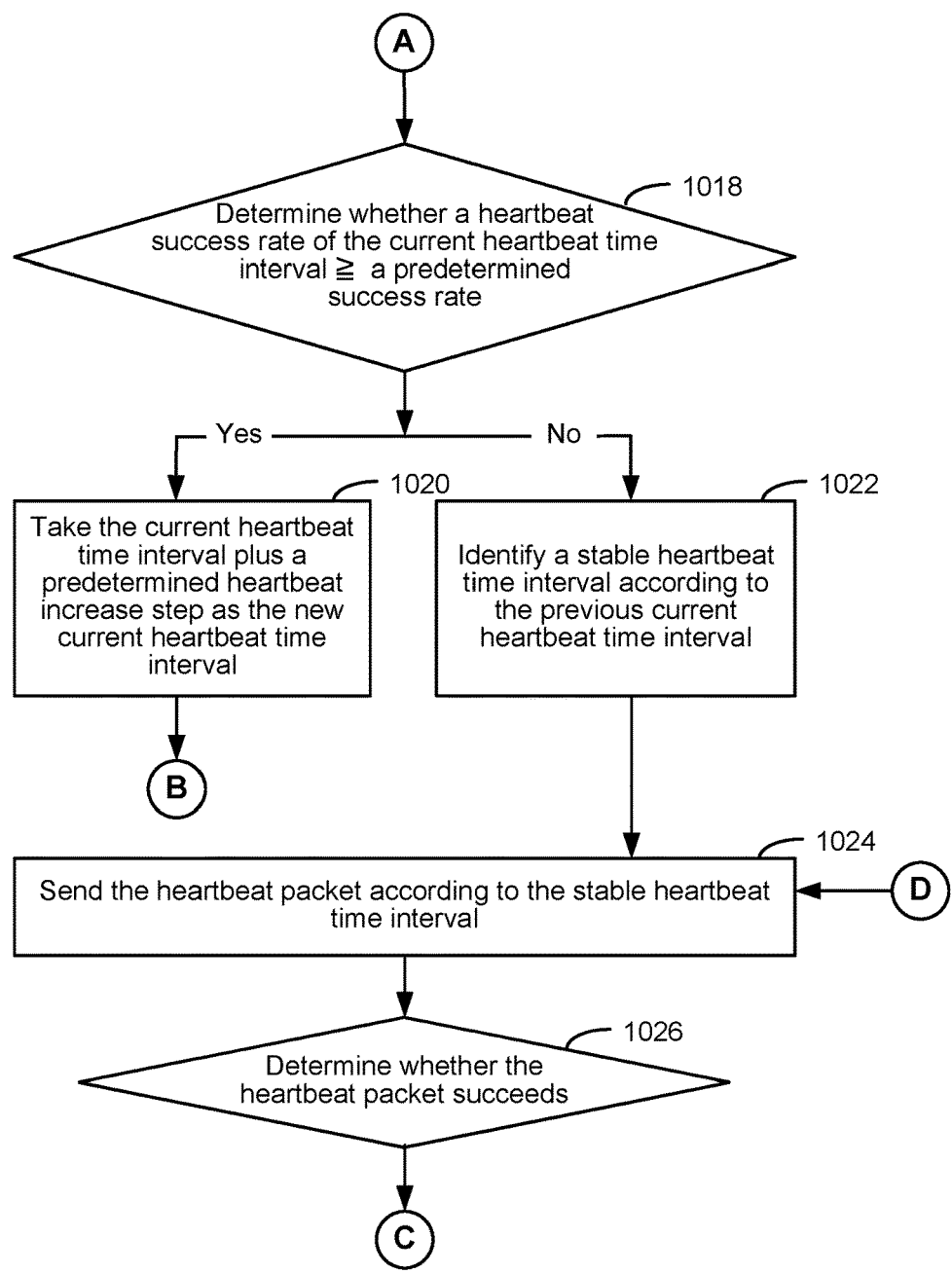
Figure 10C:
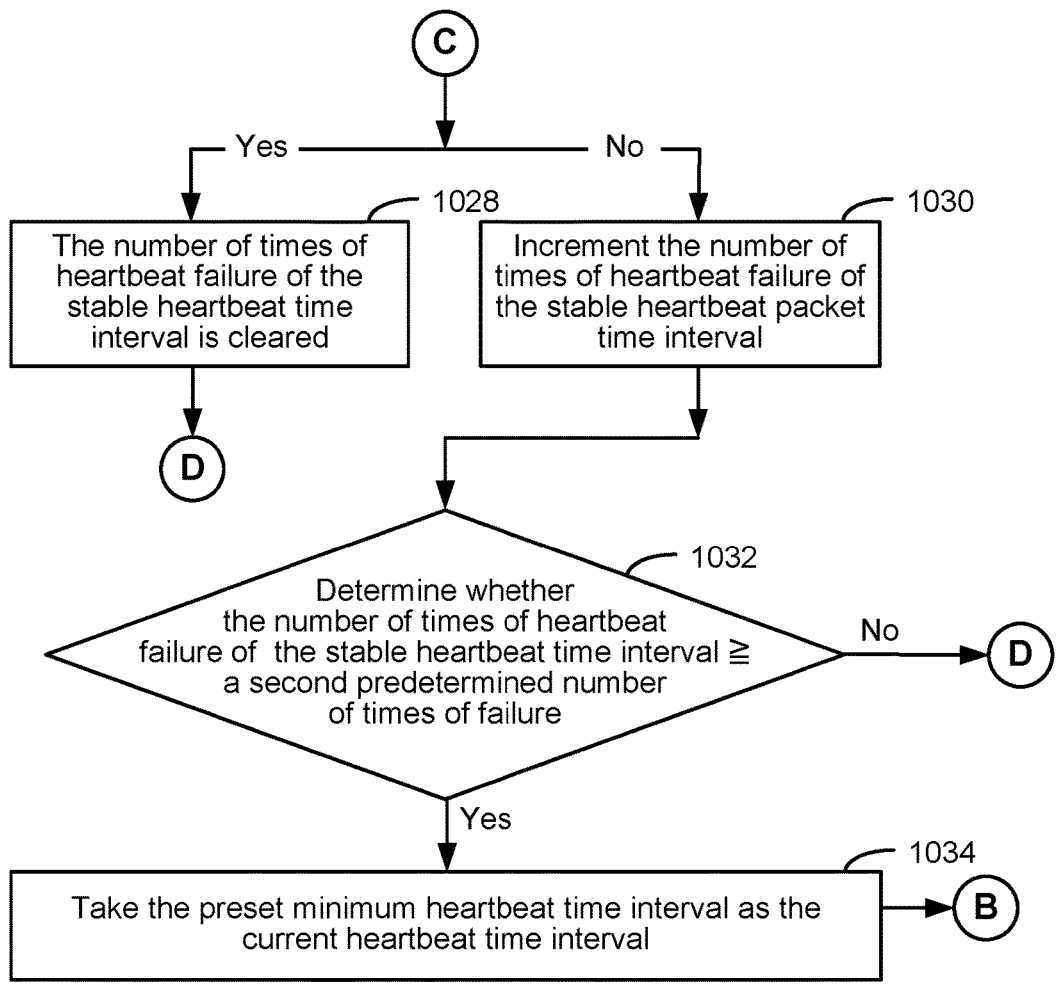
Figure 11A:
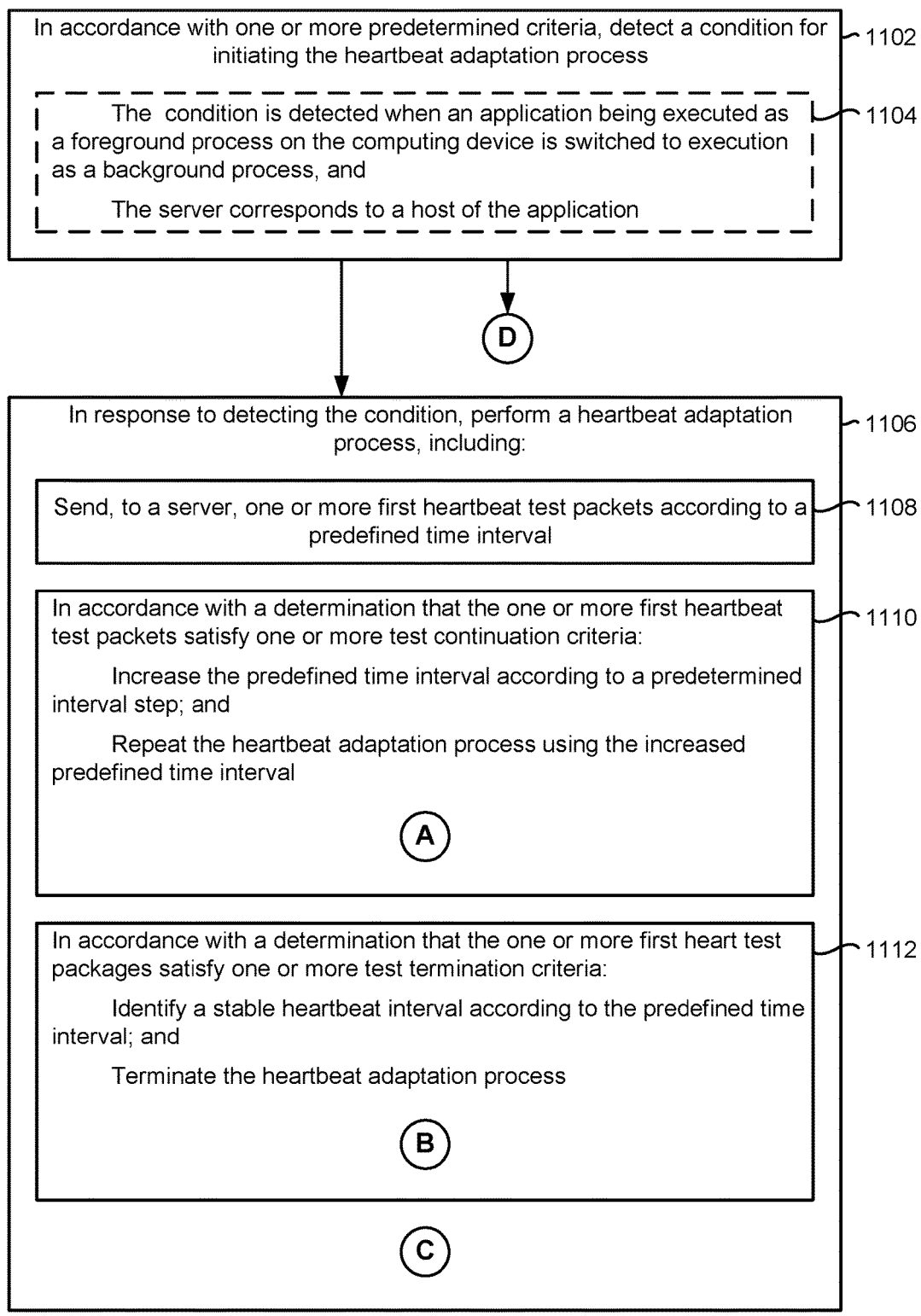
Figure 11B:
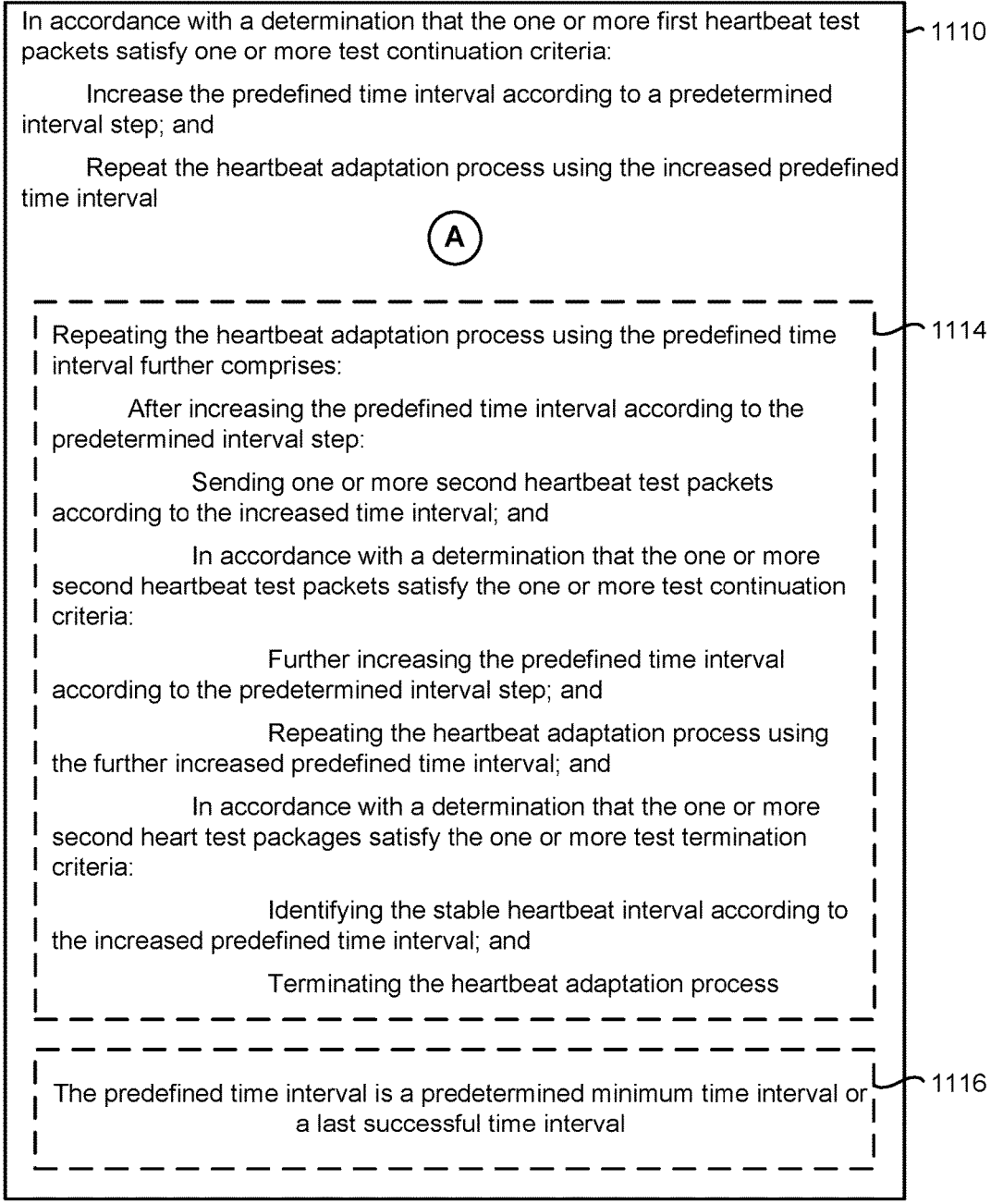
Figure 11D:
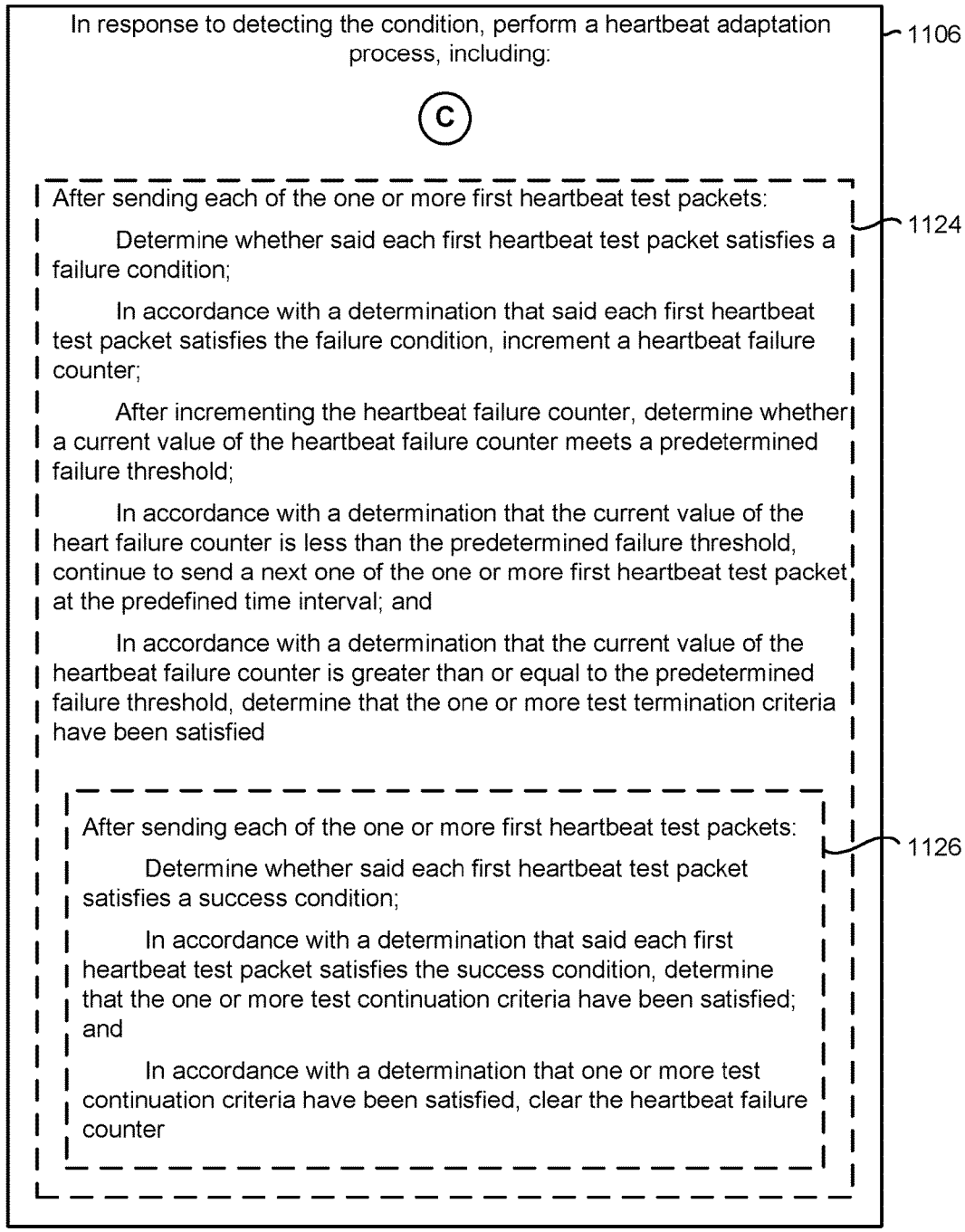
Figure 11E:
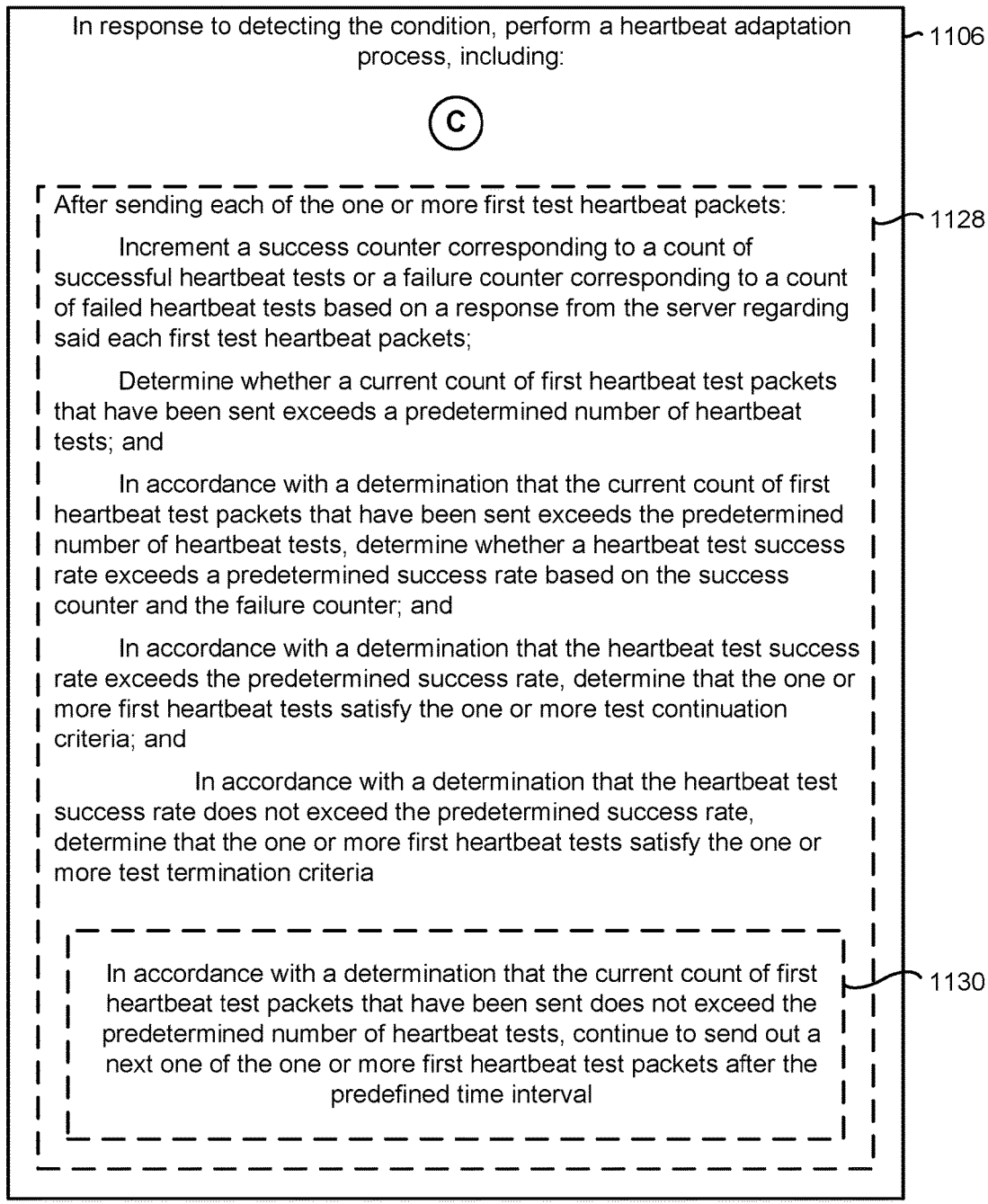

FIGS. 10A-10C illustrate a flowchart diagram of a method 1000 of intelligent heartbeat adaptation in accordance with some embodiments. In some embodiments, method 1000 is performed by a computing device with one or more processors and memory. For example, in some embodiments, method 1000 is performed by client device 104 (FIGS. 1 and 3) or a component thereof (e.g., heartbeat module 340, FIGS. 1 and 3). In some embodiments, method 1000 is governed by instructions that are stored in a non-transitory computer readable storage medium and the instructions are executed by one or more processors of the computing device.

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3). In some embodiments, client devices 104 send heartbeat signals to server system 108 maintain a data connection (e.g., a UDP or TCP connection) or access with the social networking platform.

In some embodiments, client devices 104 access one or more networks 110 via external services 122. For example, a respective one of external services 122 is a network access point or a DNS service. In some embodiments, client devices 104 send heartbeat signals to one of external services 122 to maintain a network connection or a stable IP address.

FIGS. 10A-10C illustrate a schematic flowchart of dynamically adjusting the heartbeat time interval in another specific example. Similar to the example shown in FIGS. 9A-9B, in this example, description is started from the foreground active state. Different from the example shown in FIGS. 9A-9B, in this example, it is statistically determined whether a test success condition or a test failure condition is met.

As shown in FIGS. 10A-10C, in the foreground active state, that is, when an application is executed in the foreground of the computing device and the screen of the computing device is active, a heartbeat packet is sent (1002) with a preset minimum heartbeat time interval and the state of the application is monitored (1004) continuously.

When it is monitored that the application is in a background state or the terminal is in a foreground off-screen state, the preset minimum heartbeat time interval is taken (1006) as a current heartbeat time interval to send the heartbeat packet, and after maintenance for a predetermined time period. Alternatively and/or additionally, after sending of the heartbeat packet by taking the preset minimum heartbeat time interval as the current heartbeat time interval successively succeeds a first predetermined number of times of success, the preset minimum heartbeat time interval is taken (1006) as the current heartbeat time interval for a heartbeat test. The heartbeat test is performed (1008) by sending a heartbeat packet according to the current heartbeat time interval. Subsequently, is it determined (1010) whether the heartbeat test is successful.

If the heartbeat test succeeds (1012), the number of times of heartbeat success (e.g., a success counter) of the current heartbeat time interval is incremented by one.

If the heartbeat test fails (1014), the number of times of heartbeat failure (e.g., a failure counter) of the current heartbeat time interval is incremented by one.

Then, it is determined (1016) whether the number of times of the heartbeat test of the current heartbeat time interval (e.g., the sum of the success and failure counters) is greater than or equal to a predetermined number of times of the heartbeat test.

If no, method 1000 returns to operation 1008 to continue the heartbeat test with the current heartbeat time interval.

If yes, it is determined (1018) whether a heartbeat success rate of the current heartbeat time interval (according to the number of times of heartbeat success of the current heartbeat time interval and the predetermined number of times of test) is greater than or equal to a predetermined success rate.

If the heartbeat success rate of the current heartbeat time interval is greater than or equal to the predetermined success rate, it is judged that the test success condition is met and the current heartbeat time interval plus the predetermined heartbeat increase step is taken (1020) as a new current heartbeat time interval. Subsequently, method 1000 returns to operation 1008 to perform the heartbeat test with the current heartbeat time interval.

If the heartbeat success rate of the current heartbeat time interval is less than the predetermined success rate, it is judged that the test failure condition is met, and a stable heartbeat time interval is identified (1022) according to the current heartbeat time interval. During a specific implementation, the previous current heartbeat time interval is directly determined as the stable heartbeat time interval, or a value (which is actually the previous current heartbeat time interval) obtained by subtracting the predetermined heartbeat increase step from the current heartbeat time interval is determined as the stable heartbeat time interval. In order to avoid a critical value, a difference obtained by subtracting a preset stable heartbeat step from the previous time interval can also be taken as the stable heartbeat time interval.

Then, the heartbeat packet is sent (1024) according to the stable heartbeat time interval. Subsequently, it is determined (1026) whether the heartbeat packet succeeds.

If sending of the heartbeat packet succeeds (1028), it indicates that the stable heartbeat time interval is trusted and the number of times of heartbeat failure of the stable heartbeat time interval is cleared. Subsequently, method 1000 returns to operation 1024.

If sending of the heartbeat packet fails (1030), the number of times of heartbeat failure of the stable heartbeat time interval is incremented by one. Subsequently, it is determined (1032) whether the number of times of heartbeat failure is greater than or equal to a second predetermined number of times of failure. If no, it indicates that the stable heartbeat time interval is not necessarily untrusted, and returns to operation 1024. If yes, it indicates that the stable heartbeat time interval is inappropriate and the current heartbeat time interval is set (1034) as the preset minimum heartbeat time interval. Subsequently, method 1000 returns to operation 1008 to perform the heartbeat test by sending the heartbeat packet according to the preset minimum heartbeat time interval.

In order to eliminate accidental failure, make the test result relatively reliable, and ensure timeliness of message receiving in the case of larger network fluctuations, after the preset minimum heartbeat time interval is set to the current heartbeat time interval, a delayed heartbeat test can be performed a certain number of times (e.g., 3 times or 5 times) at first, and after the delayed heartbeat test succeeds, proceed to the step of performing the test with the current heartbeat time interval.

It should be noted that, in the example shown in FIGS. 10A-10C, simultaneous recording of the number of times of heartbeat success of the current heartbeat time interval and the number of times of failure of the current heartbeat time interval are taken as an example. In the case of judging whether the test success condition or the test failure condition is met according to the heartbeat success rate of the current heartbeat time interval, the number of times of failure of the current heartbeat time interval may not be recorded, as long as the number of times of heartbeat success of the current heartbeat time interval and the number of times the test has been performed are known. A person skilled in the art can deduce that, based on the above principle, it is also feasible to only record the number of times of failure of the current heartbeat time interval and the number of times the test has been performed, calculate a heartbeat failure rate of the current heartbeat time interval, and judge the heartbeat failure rate of the current heartbeat packet interval and a preset failure rate threshold, which is not detailed herein.

It should be understood that the particular order in which the operations in FIGS. 10A-10C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 400, 600, 700, 900, and 1100) are also applicable in an analogous manner to method 1000 described above with respect to FIGS. 10A-10C.

FIGS. 11A-11E illustrate a flowchart diagram of a method 1100 of performing a heartbeat adaptation process in accordance with some embodiments. In some embodiments, method 1100 is performed by a computing device with one or more processors and memory. For example, in some embodiments, method 1100 is performed by client device 104 (FIGS. 1 and 3) or a component thereof (e.g., heartbeat module 340, FIGS. 1 and 3). In some embodiments, method 1100 is governed by instructions that are stored in a non-transitory computer readable storage medium and the instructions are executed by one or more processors of the computing device. Optional operations are indicated by dashed lines (e.g., boxes with dashed-line borders).

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3). In some embodiments, client devices 104 send heartbeat signals to server system 108 maintain a data connection (e.g., a UDP or TCP connection) or access with the social networking platform.

In some embodiments, client devices 104 access one or more networks 110 via external services 122. For example, a respective one of external services 122 is a network access point or a DNS service. In some embodiments, client devices 104 send heartbeat signals to one of external services 122 to maintain a network connection or a stable IP address.

In accordance with one or more predetermined criteria, the computing device detects (1102) a condition for initiating the heartbeat adaptation process. In some embodiments, client device 104 or a component thereof (e.g., condition detecting module 344, FIG. 3) detects the condition for initiating the heartbeat adaptation process in accordance with one or more predetermined criteria. For example, the condition is detected when client device 104 switches networks. In another example, the condition is detected when an application (e.g., the social networking platform) switches from being executed in the foreground on client device 104 to the background for a predetermined period of time. In another example, the condition is detected when client device 104 is assigned a predefined IP address or set of IP addresses or merely a different IP address by its ISP DNS service. In some embodiments, the condition is detected when one of the above states (e.g., network, application state, IP assignment) has remained unchanged after the switching for at least a threshold period of time, in other words, the state has remained stable for at least the threshold period of time.

In some embodiments, the condition is detected (1104) when an application being executed as a foreground process on the computing device is switched to execution as a background process, and the server corresponds to a host of the application. For example, the heartbeat is used to maintain a data connection (e.g., a TCP/UDP connection) with server system 108 of the social networking platform or a server (e.g., an application or web server) of another online application.

In response to detecting the condition, the computing device performs (1106) a heartbeat adaptation process. In some embodiments, client device 104 or a component thereof (e.g., heartbeat adaptation module 346, FIG. 3) performs a heartbeat adaptation process to adjust the frequency of heartbeat packets sent to the server (e.g., server system 108 of the social networking platform or one or one of external services 122) in response to detecting the condition for initiating the heartbeat adaptation process in operation 1102.

As part of the heartbeat adaptation process, the computing device sends (1108), to a server, one or more first heartbeat test packets according to a predefined time interval. In some embodiments, client device 104 or a component thereof (e.g., test packet sending module 348, FIG. 3) sends, to the server (e.g., server system 108 or one of external services 122), one or more first heartbeat test packets according to a predefined time interval (e.g., stored in heartbeat parameters table 372, FIG. 3). In some embodiments, the heartbeat adaptation process is performed to keep the computing device's IP address stable. In some embodiments, the heartbeat adaptation process is performed to maintain a TCP/UDP connection with an application or web server (e.g., server system 108 of the social networking platform). In some embodiments, the predefined time interval is a predetermined minimum interval time (e.g., set by a server). In some embodiments, sending the one or more first heartbeat packets according to the predefined time interval includes sending a first test heartbeat packet at a first time, where the first test heartbeat packet is separated from its immediate preceding heartbeat packet by the predefined time interval. The predefined time interval is different from the time interval used to send the heartbeat packet immediately before the start of the heartbeat adaptation process. After the first test heartbeat was sent, the computing device optionally sends out a second test heartbeat packet at a second time, where the second time is separated from the first test heartbeat packet by the predefined time interval. The computing device continues to send the test heartbeat packets at the predefined intervals until the heartbeat test criteria is satisfied and a different test interval is used, or when the heartbeat adaptation process is ended.

In some embodiments, client device 104 or a component thereof (e.g., determining module 350, FIG. 3) determines whether each of the one or more first heartbeat test packets satisfy one or more test continuation criteria or one or more test termination criteria. In some embodiments, the one or more test continuation criteria are satisfied when the server responds to or acknowledges the heartbeat test packet within a first predetermined time period. In some embodiments, the one or more test termination criteria are satisfied when the server responds to or acknowledges the heartbeat test packet within a second predetermined time period that is greater than the first predetermined time period or not at all.

In accordance with a determination that the one or more first heartbeat test packets satisfy one or more test continuation criteria, the computing device (1110): increases the predefined time interval according to a predetermined interval step; and repeats the heartbeat adaptation process using the increased predefined time interval. In accordance with a determination by determining module 350 that the one or more first heartbeat test packets satisfy the one or more test continuation criteria, client device 104 or a component thereof (e.g., repeating module 352, FIG. 3) increases the predefined time interval according to a predetermined interval step (e.g., stored in heartbeat parameters table 372, FIG. 3) and repeats the heartbeat adaptation process using the increased predefined time interval. For example, if the predetermined interval step is 1 minutes and the predefined time interval was 4 minutes, the predefined time interval for sending the next test packet is increased to 5 minutes and the computing device waits 5 minutes before repeating the heartbeat adaptation process and sending the one or more second test packets.

In some embodiments, the computing device repeats the heartbeat adaptation process using the predefined time interval by (1114) sending one or more second heartbeat test packets according to the increased time interval after increasing the predefined time interval according to the predetermined interval step. In accordance with a determination that the one or more second heartbeat test packets satisfy the one or more test continuation criteria, the computing device: further increases the predefined time interval according to the predetermined interval step; and repeats the heartbeat adaptation process using the further increased predefined time interval. In accordance with a determination that the one or more second heart test packages satisfy the one or more test termination criteria, the computing device: identifies the stable heartbeat interval according to the increased predefined time interval; and terminates the heartbeat adaptation process. After sending the one or more second test packets according to the increased time interval, client device 104 or a component thereof (e.g., determining module 350, FIG. 3) determines whether each of the one or more second heartbeat test packets satisfy one or more test continuation criteria or one or more test termination criteria. In accordance with a determination by determining module 350 that the one or more second heartbeat test packets satisfy the one or more test continuation criteria, client device 104 or a component thereof (e.g., repeating module 352, FIG. 3) increases the predefined time interval according to a predetermined interval step (e.g., stored in heartbeat parameters table 372, FIG. 3) and repeats the heartbeat adaptation process using the increased predefined time interval. In accordance with a determination by determining module 350 that the one or more second heartbeat test packets satisfy the one or more test termination criteria, client device 104 or a component thereof (e.g., identifying module 354, FIG. 3) identifies a stable heartbeat interval according to the increased time interval and stores the stable heartbeat interval in heartbeat parameters table 372 (FIG. 3), and client device 104 or a component thereof (e.g., terminating module 356, FIG. 3) terminates the heartbeat adaptation process.

In some embodiments, the predefined time interval is (1116) a predetermined minimum time interval or a last successful time interval. For example, the predefined time interval is a predetermined minimum time interval set by the server and stored in heartbeat parameters table 372 (FIG. 3). In another example, the predefined time interval is a last successful time interval from a previous heartbeat adaptation test that is stored in heartbeat parameters table 372 (FIG. 3).

In accordance with a determination that the one or more first heart test packages satisfy one or more test termination criteria, the computing device (1112): identifies a stable heartbeat interval according to the predefined time interval; and terminates the heartbeat adaptation process. In accordance with a determination by determining module 350 that the one or more first heartbeat test packets satisfy the one or more test termination criteria, client device 104 or a component thereof (e.g., identifying module 354, FIG. 3) identifies a stable heartbeat interval according to the increased time interval and stores the stable heartbeat interval in heartbeat parameters table 372 (FIG. 3), and client device 104 or a component thereof (e.g., terminating module 356, FIG. 3) terminates the heartbeat adaptation process.

In some embodiments, after terminating the heartbeat adaptation process, the computing device periodically sends (1118), to the server, one or more heartbeat packets according to the stable heartbeat interval. After terminating the heartbeat adaptation process in operation 1112, client device 104 or a component thereof (e.g., heartbeat sending module 342, FIG. 3) sends heartbeat packets to server system 108 to maintain a data connection or to external services 122 to maintain a network connection or a stable IP address according to the stable heartbeat interval identified in operation 1112 and stored in heartbeat parameters table 372 (FIG. 3).

In some embodiments, the heartbeat packet includes (1120) a location of the computing device. For example, when the computing device is sharing its location with other user devices or has other location services enabled, the location information may be included in the heartbeat packet to save bandwidth and data usage. In some embodiments, the heartbeat packet includes other historical or usage information corresponding to the computing device.

In some embodiments, the computing device determines (1122) a respective time interval preferred by the computing device based on one or more parameters, prompting the server to approve the respective time interval preferred by the computing device, and, in accordance with a determination that the server approves the respective time interval, sets the respective time interval as the stable heartbeat interval to bypass sending the one or more first heartbeat packets to determine the stable heartbeat interval. In some embodiments, prior to sending the one or more first test packets or in accordance with a determination by determining module 350 that the one or more first heartbeat test packets satisfy the one or more test continuation criteria, client device 104 or a component thereof (e.g., custom interval module 358, FIG. 3) determines a respective custom time interval preferred by client device 104 based on one or more parameters and prompts the server (e.g., server system 108 or one of external services 122) to approve of the respective time interval preferred by client device 104. In some embodiments, in accordance with a determination that the server approves the respective time interval, client device 104 or a component thereof (e.g., custom interval module 358, FIG. 3) sets the respective custom time interval preferred by client device 104 as the stable heartbeat interval and stores it as such in heartbeat parameters table 372 (FIG. 3). In some embodiments, the computing device determines the respective time interval based on the device's requirements, historical usage, and view of the network. In some embodiments, the computing device receives no response, a no acknowledgement, or a yes acknowledgement. Sometimes, the no response is taken as a yes acknowledgement. In some embodiments, the respective time interval is used as the predefined time interval to start the adaptation process at a higher time interval value and shorten the heartbeat adaptation process.

In some embodiments, after sending each of the one or more first heartbeat test packets, the computing device (1124): determines whether said each first heartbeat test packet satisfies a failure condition; in accordance with a determination that said each first heartbeat test packet satisfies the failure condition, increments a heartbeat failure counter; and, after incrementing the heartbeat failure counter, determines whether a current value of the heartbeat failure counter meets a predetermined failure threshold. In accordance with a determination that the current value of the heart failure counter is less than the predetermined failure threshold, the computing device continues to send a next one of the one or more first heartbeat test packet at the predefined time interval. In accordance with a determination that the current value of the heartbeat failure counter is greater than or equal to the predetermined failure threshold, the computing device determines that the one or more test termination criteria have been satisfied. In some embodiments, client device 104 or a component thereof (e.g., determining module 350, FIG. 3) determines whether each of the one or more first heartbeat test packets satisfy the failure condition. In some embodiments, a value of the heartbeat failure counter is stored in heartbeat parameters table 372 (FIG. 3). For further discussion of incrementing a heartbeat failure counter as in operation 1124 of method 1100, see operation 608 of method 600 or operation 708 of method 700. For further discussion of determining whether a current value of the heartbeat failure counter meets a predetermined failure threshold as in operation 1124 of method 1100, see operation 610 of method 600 or operation 710 of method 700.

In some embodiments, after sending each of the one or more first heartbeat test packets, the computing device determines (1126) whether said each first heartbeat test packet satisfies a success condition. In accordance with a determination that said each first heartbeat test packet satisfies the success condition, the computing device determines that the one or more test continuation criteria have been satisfied. In accordance with a determination that one or more test continuation criteria have been satisfied, the computing device clears the heartbeat failure counter. In some embodiments, client device 104 or a component thereof (e.g., determining module 350, FIG. 3) determines whether each of the one or more first heartbeat test packets satisfy the success condition. For further discussion of clearing the heartbeat failure counter as in operation 1126 of method 1100, see operation 706 of method 700.

In some embodiments, after sending each of the one or more first test heartbeat packets, the computing device (1128): increments a success counter corresponding to a count of successful heartbeat tests or a failure counter corresponding to a count of failed heartbeat tests based on a response from the server regarding said each first test heartbeat packets; determines whether a current count of first heartbeat test packets that have been sent exceeds a predetermined number of heartbeat tests; and, in accordance with a determination that the current count of first heartbeat test packets that have been sent exceeds the predetermined number of heartbeat tests, determines whether a heartbeat test success rate exceeds a predetermined success rate based on the success counter and the failure counter. In accordance with a determination that the heartbeat test success rate exceeds the predetermined success rate, the computing device determines that the one or more first heartbeat tests satisfy the one or more test continuation criteria. In accordance with a determination that the heartbeat test success rate does not exceed the predetermined success rate, the computing device determines that the one or more first heartbeat tests satisfy the one or more test termination criteria. In some embodiments, values for the success and failure counters are stored in heartbeat parameters table 372 (FIG. 3 For further discussion of incrementing the success counter as in operation 1128 of method 1100, see operation 1012 of method 1000, and, for further discussion of incrementing the failure counter as in operation 1128 of method 1100, see operation 1014 of method 1000. For further discussion of determining whether a heartbeat test success rate exceeds a predetermined success rate based on the success counter and the failure counter as in operation 1128 of method 1100, see operation 1018 of method 1000.

In some embodiments, in accordance with a determination that the current count of first heartbeat test packets that have been sent does not exceed the predetermined number of heartbeat tests, the computing device continues (1130) to send out a next one of the one or more first heartbeat test packets after the predefined time interval. For example, operation 1130 of method 1100 is similar to operation 1016 in method 1000.

It should be understood that the particular order in which the operations in FIGS. 11A-11E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 400, 600, 700, 900, and 1000) are also applicable in an analogous manner to method 1100 described above with respect to FIGS. 11A-11E.

Figure 12:
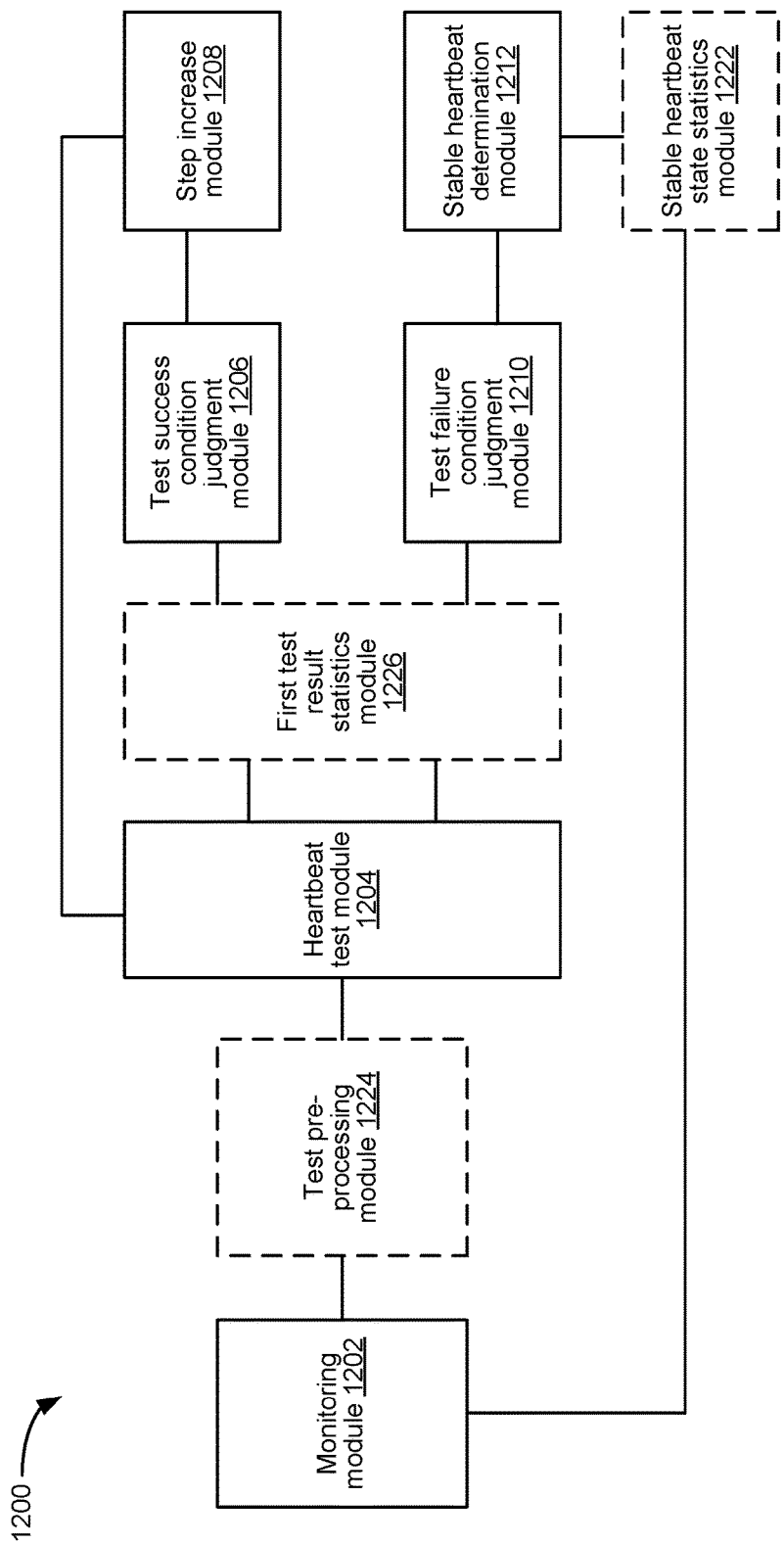
FIG. 12 is a block diagram of an apparatus for intelligent heartbeat adaptation in accordance with some embodiments.

FIG. 12 is a block diagram of an apparatus 1200 for intelligent heartbeat adaptation in accordance with some embodiments. In some embodiments, apparatus 1200 may be implemented in whole or in part by software, hardware, firmware, or a combination thereof. For example, apparatus 1200 corresponds to client device 104 (FIGS. 1 and 3) or a component thereof (e.g., heartbeat module 340, FIGS. 1 and 3). In some embodiments, apparatus 1200 includes: monitoring module 1202, heartbeat test module 1204, test success condition judgment module 1206, step increase module 1208, test failure condition judgment module 1210, and stable heartbeat determination module 1212.

In some embodiments, monitoring module 1202 is configured to determine whether a condition for performing an intelligent heartbeat self-adaption process is met.

In some embodiments, heartbeat test module 1204 is configured to perform a heartbeat test by sending a heartbeat packet according to a current heartbeat time interval. In some embodiments, heartbeat test module 1204 performs the heartbeat test when the monitoring module 1202 determines that condition for performing an intelligent heartbeat self-adaption process is met. In some embodiments, heartbeat test module 1204 performs the heartbeat test according to a result of step increase module 1208.

In some embodiments, test success condition judgment module 1206 is configured to determine whether a test success condition is met according to the test result of heartbeat test module 1204.

In some embodiments, step increase module 1208 is configured to identify a new current heartbeat time interval as the current heartbeat time interval plus a predetermined heartbeat increase step when test success condition judgment module 1206 determines that the test success condition is met.

In some embodiments, test failure condition judgment module 1210 is configured to determine whether a test failure condition is met according to the test result of heartbeat test module 1204.

In some embodiments, stable heartbeat packet determination module 1212 is configured to identify a stable heartbeat time interval according to the current heartbeat time interval when test failure condition judgment module 1210 determines that the test failure condition is met.

In some embodiments, apparatus 1200 further includes stable heartbeat state statistics module 1222, test pre-processing module 1224, and first test result statistics module 1226.

In some embodiments, stable heartbeat state statistics module 1222 is configured to record the number of times of successive failure when the heartbeat packet is sent with the stable heartbeat time interval.

In some embodiments, test pre-processing module 1224 is configured to maintain a heartbeat for a predetermined time period in a manner of sending a heartbeat packet with a preset minimum heartbeat time interval after monitoring module 1202 determines that the condition for performing the intelligent heartbeat self-adaption process is met.

In some embodiments, first test result statistics module 1226 is configured to record the number of times of test success and the number of times of test failure a heartbeat test is performed and to determine a success rate according to the number of times of test success and the number of times of test failure.

Figure 13A:
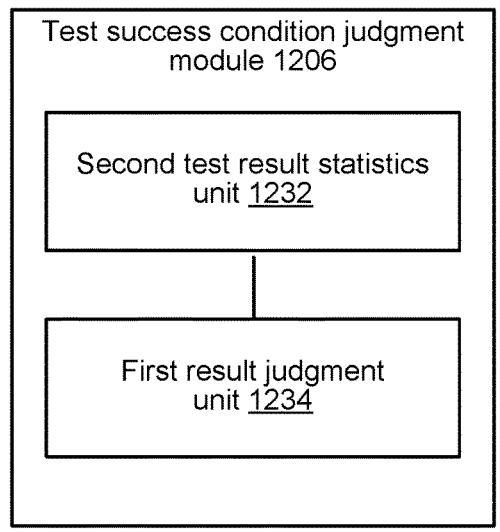
FIG. 13A is a block diagram of a module of the apparatus in FIG. 12 in accordance with some embodiments.

As shown in FIG. 13A, in some embodiments, test success condition judgment module 1206 includes second test result statistics unit 1232 and first result judgment unit 1234.

In some embodiments, second test result statistics unit 1232 is configured to record the number of times of successive success the heartbeat test is performed with the current heartbeat time interval.

In some embodiments, first result judgment unit 1234 is configured to judge that the test success condition is met when the number of times of successive success recorded by second test result statistics unit 1232 is greater than or equal to a second predetermined number of times of success. For example, the second predetermined number of times of success may be set to once, or may be set to other times, such as 3 times or 5 times, and different settings can be made in specific applications.

Figure 13B:
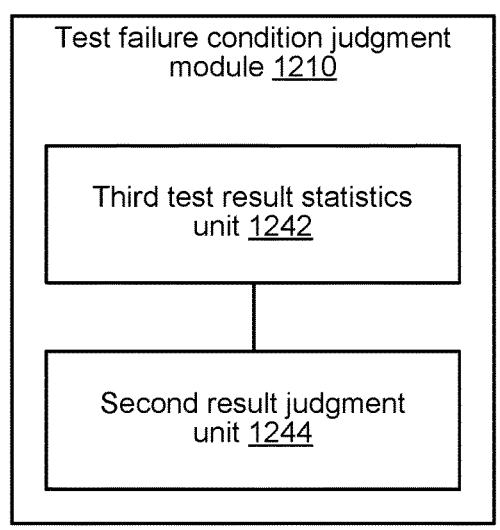
FIG. 13B is a block diagram of a module of the apparatus in FIG. 12 in accordance with some embodiments.

As shown in FIG. 13B, in some embodiments, test failure condition judgment module 1210 includes third test result statistics unit 1242 and second result judgment unit 1244.

In some embodiments, third test result statistics unit 1242 is configured to record the number of times the heartbeat test performed with the current heartbeat time interval cumulatively fails.

In some embodiments, second result judgment unit 1244 is configured to judging that the test failure condition is met when the accumulated number of times the heartbeat test cumulatively fails recorded by third test result statistics unit 1242 is greater than or equal to a first predetermined number of times of failure. For example, the first predetermined number of times of failure can be set differently based on actual application demands, such as once, 3 times or 5 times, and different settings can be made in specific applications.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of performing a heartbeat adaptation process, the method comprising:
   at a computing device with one or more processors and memory:
      in accordance with one or more predetermined criteria, detecting a condition for initiating the heartbeat adaptation process;
      in response to detecting the condition, performing the heartbeat adaptation process, including:
         sending, to a server, one or more first heartbeat test packets according to a predefined time interval;
         in accordance with a determination that the one or more first heartbeat test packets satisfy one or more test continuation criteria:
            increasing the predefined time interval according to a predetermined interval step; and
            repeating the heartbeat adaptation process using the increased predefined time interval; and
         in accordance with a determination that the one or more first heart test packages satisfy one or more test termination criteria:
            identifying a stable heartbeat interval according to the predefined time interval; and
            terminating the heartbeat adaptation process.

2. The method of claim 1, wherein repeating the heartbeat adaptation process using the predefined time interval further comprises:
   after increasing the predefined time interval according to the predetermined interval step:
      sending one or more second heartbeat test packets according to the increased time interval; and
      in accordance with a determination that the one or more second heartbeat test packets satisfy the one or more test continuation criteria:
         further increasing the predefined time interval according to the predetermined interval step; and
         repeating the heartbeat adaptation process using the further increased predefined time interval; and
      in accordance with a determination that the one or more second heart test packages satisfy the one or more test termination criteria:
         identifying the stable heartbeat interval according to the increased predefined time interval; and
         terminating the heartbeat adaptation process.

3. The method of claim 1, further comprising:
   after terminating the heartbeat adaptation process, periodically sending, to the server, one or more heartbeat packets according to the stable heartbeat interval.

4. The method of claim 1, further comprising:
   after sending each of the one or more first heartbeat test packets:
      determining whether said each first heartbeat test packet satisfies a failure condition;
      in accordance with a determination that said each first heartbeat test packet satisfies the failure condition, incrementing a heartbeat failure counter;
      after incrementing the heartbeat failure counter, determining whether a current value of the heartbeat failure counter meets a predetermined failure threshold;
      in accordance with a determination that the current value of the heart failure counter is less than the predetermined failure threshold, continuing to send a next one of the one or more first heartbeat test packet at the predefined time interval; and
      in accordance with a determination that the current value of the heartbeat failure counter is greater than or equal to the predetermined failure threshold, determining that the one or more test termination criteria have been satisfied.

5. The method of claim 4, further comprising:
after sending each of the one or more first heartbeat test packets:
determining whether said each first heartbeat test packet satisfies a success condition;
in accordance with a determination that said each first heartbeat test packet satisfies the success condition, determining that the one or more test continuation criteria have been satisfied; and
in accordance with a determination that one or more test continuation criteria have been satisfied, clearing the heartbeat failure counter.

6. The method of claim 1, wherein the condition is detected when an application being executed as a foreground process on the computing device is switched to execution as a background process, and
wherein the server corresponds to a host of the application.

7. The method of claim 1, further comprising:
determining a respective time interval preferred by the computing device based on one or more parameters;
prompting the server to approve the respective time interval preferred by the computing device; and
in accordance with a determination that the server approves the respective time interval, setting the respective time interval as the stable heartbeat interval to bypass sending the one or more first heartbeat packets to determine the stable heartbeat interval.

8. A computing device, comprising:
one or more processors; and
memory storing one or more programs to be executed by the one or more processors, the one or more programs comprising instructions for:
in accordance with one or more predetermined criteria, detecting a condition for initiating the heartbeat adaptation process;
in response to detecting the condition, performing the heartbeat adaptation process, including:
sending, to a server, one or more first heartbeat test packets according to a predefined time interval;
in accordance with a determination that the one or more first heartbeat test packets satisfy one or more test continuation criteria:
increasing the predefined time interval according to a predetermined interval step; and
repeating the heartbeat adaptation process using the increased predefined time interval; and
in accordance with a determination that the one or more first heart test packages satisfy one or more test termination criteria:
identifying a stable heartbeat interval according to the predefined time interval; and
terminating the heartbeat adaptation process.

9. The computing device of claim 8, wherein repeating the heartbeat adaptation process using the predefined time interval further comprises:
after increasing the predefined time interval according to the predetermined interval step:
sending one or more second heartbeat test packets according to the increased time interval; and
in accordance with a determination that the one or more second heartbeat test packets satisfy the one or more test continuation criteria:
further increasing the predefined time interval according to the predetermined interval step; and
repeating the heartbeat adaptation process using the further increased predefined time interval; and
in accordance with a determination that the one or more second heart test packages satisfy the one or more test termination criteria:
identifying the stable heartbeat interval according to the increased predefined time interval; and
terminating the heartbeat adaptation process.

10. The computing device of claim 8, wherein the one or more programs further comprise instructions for:
after terminating the heartbeat adaptation process, periodically sending, to the server, one or more heartbeat packets according to the stable heartbeat interval.

11. The computing device of claim 8, wherein the one or more programs further comprise instructions for:
after sending each of the one or more first heartbeat test packets:
determining whether said each first heartbeat test packet satisfies a failure condition;
in accordance with a determination that said each first heartbeat test packet satisfies the failure condition, incrementing a heartbeat failure counter;
after incrementing the heartbeat failure counter, determining whether a current value of the heartbeat failure counter meets a predetermined failure threshold;
in accordance with a determination that the current value of the heart failure counter is less than the predetermined failure threshold, continuing to send a next one of the one or more first heartbeat test packet at the predefined time interval; and
in accordance with a determination that the current value of the heartbeat failure counter is greater than or equal to the predetermined failure threshold, determining that the one or more test termination criteria have been satisfied.

12. The computing device of claim 11, wherein the one or more programs further comprise instructions for:
after sending each of the one or more first heartbeat test packets:
determining whether said each first heartbeat test packet satisfies a success condition;
in accordance with a determination that said each first heartbeat test packet satisfies the success condition, determining that the one or more test continuation criteria have been satisfied; and
in accordance with a determination that one or more test continuation criteria have been satisfied, clearing the heartbeat failure counter.

13. The computing device of claim 8, wherein the condition is detected when an application being executed as a foreground process on the computing device is switched to execution as a background process, and
wherein the server corresponds to a host of the application.

14. The computing device of claim 8, wherein the one or more programs further comprise instructions for:
determining a respective time interval preferred by the computing device based on one or more parameters;
prompting the server to approve the respective time interval preferred by the computing device; and
in accordance with a determination that the server approves the respective time interval, setting the respective time interval as the stable heartbeat interval to bypass sending the one or more first heartbeat packets to determine the stable heartbeat interval.

15. A non-transitory computer readable storage medium storing one or more programs, the one or more programs comprising instructions, which, when executed by a computing device with one or more processors, cause the computing device to perform operations comprising:
in accordance with one or more predetermined criteria, detecting a condition for initiating the heartbeat adaptation process;
in response to detecting the condition, performing the heartbeat adaptation process, including:
sending, to a server, one or more first heartbeat test packets according to a predefined time interval;
in accordance with a determination that the one or more first heartbeat test packets satisfy one or more test continuation criteria:
increasing the predefined time interval according to a predetermined interval step; and
repeating the heartbeat adaptation process using the increased predefined time interval; and
in accordance with a determination that the one or more first heart test packages satisfy one or more test termination criteria:
identifying a stable heartbeat interval according to the predefined time interval; and
terminating the heartbeat adaptation process.

16. The non-transitory computer readable storage medium of claim 15, wherein repeating the heartbeat adaptation process using the predefined time interval further comprises:
after increasing the predefined time interval according to the predetermined interval step:
sending one or more second heartbeat test packets according to the increased time interval; and
in accordance with a determination that the one or more second heartbeat test packets satisfy the one or more test continuation criteria:
further increasing the predefined time interval according to the predetermined interval step; and
repeating the heartbeat adaptation process using the further increased predefined time interval; and
in accordance with a determination that the one or more second heart test packages satisfy the one or more test termination criteria:
identifying the stable heartbeat interval according to the increased predefined time interval; and
terminating the heartbeat adaptation process.

17. The non-transitory computer readable storage medium of claim 15, wherein the instructions cause the computing device to perform operations further comprising:
after terminating the heartbeat adaptation process, periodically sending, to the server, one or more heartbeat packets according to the stable heartbeat interval.

18. The non-transitory computer readable storage medium of claim 15, wherein the instructions cause the computing device to perform operations further comprising:
after sending each of the one or more first heartbeat test packets:
determining whether said each first heartbeat test packet satisfies a failure condition;
in accordance with a determination that said each first heartbeat test packet satisfies the failure condition, incrementing a heartbeat failure counter;
after incrementing the heartbeat failure counter, determining whether a current value of the heartbeat failure counter meets a predetermined failure threshold;
in accordance with a determination that the current value of the heart failure counter is less than the predetermined failure threshold, continuing to send a next one of the one or more first heartbeat test packet at the predefined time interval; and
in accordance with a determination that the current value of the heartbeat failure counter is greater than or equal to the predetermined failure threshold, determining that the one or more test termination criteria have been satisfied.

19. The non-transitory computer readable storage medium of claim 18, wherein the instructions cause the computing device to perform operations further comprising:
after sending each of the one or more first heartbeat test packets:
determining whether said each first heartbeat test packet satisfies a success condition;
in accordance with a determination that said each first heartbeat test packet satisfies the success condition, determining that the one or more test continuation criteria have been satisfied; and
in accordance with a determination that one or more test continuation criteria have been satisfied, clearing the heartbeat failure counter.

20. The non-transitory computer readable storage medium of claim 15, wherein the condition is detected when an application being executed as a foreground process on the computing device is switched to execution as a background process, and
wherein the server corresponds to a host of the application.

* * * * *